(12) United States Patent
Kunkel et al.

(10) Patent No.: US 10,940,817 B2
(45) Date of Patent: Mar. 9, 2021

(54) SIDE UNDERRIDE GUARD

(71) Applicant: Wabash National, L.P., Lafayette, IN (US)

(72) Inventors: David P. Kunkel, Lebanon, IN (US); Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 16/280,888

(22) Filed: Feb. 20, 2019

(65) Prior Publication Data

US 2019/0256026 A1    Aug. 22, 2019

Related U.S. Application Data

(60) Provisional application No. 62/633,313, filed on Feb. 21, 2018.

(51) Int. Cl.
| | | |
|---|---|---|
| *B60R 19/56* | (2006.01) | |
| *B62D 35/00* | (2006.01) | |
| *B62D 63/08* | (2006.01) | |

(52) U.S. Cl.
CPC .......... *B60R 19/565* (2013.01); *B62D 35/001* (2013.01); *B62D 35/008* (2013.01); *B62D 63/08* (2013.01)

(58) Field of Classification Search
CPC ....... B60R 19/56; B60R 19/565; B62D 21/20; B62D 35/001; B62D 35/008
USPC ..................................................... 296/180.4
See application file for complete search history.

(56) References Cited

U.S. PATENT DOCUMENTS

| | | | |
|---|---|---|---|
| 164,252 A | 6/1875 | Bass | |
| 221,817 A | 11/1879 | Heyn | |
| 357,800 A | 2/1887 | Wescott | |
| 495,801 A | 4/1893 | Henthorne | |
| 564,027 A | 7/1896 | Pratt | |
| 824,541 A | 6/1906 | Hager | |
| 1,127,241 A | 2/1915 | Hawksworth | |
| 1,482,637 A | 2/1924 | Fergusson | |
| 2,231,089 A | 2/1941 | Rorer | |

(Continued)

FOREIGN PATENT DOCUMENTS

| | | |
|---|---|---|
| CA | 2651688 A1 | 7/2009 |
| CA | 2715304 A1 | 3/2011 |

(Continued)

OTHER PUBLICATIONS

Non-Final Office Action issued in corresponding U.S. Appl. No. 12/760,798, dated Oct. 13, 2011, 12 pages.

(Continued)

*Primary Examiner* — Jason S Daniels
(74) *Attorney, Agent, or Firm* — Quarles & Brady LLP

(57) ABSTRACT

A side underride system configured to be coupled to a trailer is disclosed. The side underride system comprises a support system configured to be positioned below the trailer to provide side underride protection. The support system includes a cable system and a brace system. The cable system is configured to couple to the trailer. The brace system includes a plurality of cross-braces that each extend at least partially across a width of the trailer, are spaced apart at intervals along a length of the trailer, and are configured to capture the cable system.

13 Claims, 16 Drawing Sheets

(56) References Cited

U.S. PATENT DOCUMENTS

| | | |
|---|---|---|
| 2,318,863 A | 5/1943 | Jabelmann |
| 2,737,411 A | 3/1956 | Potter |
| 2,862,333 A | 12/1958 | Gardiol |
| 3,256,655 A | 6/1966 | Teeter |
| 3,401,953 A | 9/1968 | Prohl |
| 3,483,939 A | 12/1969 | Owen |
| 3,487,999 A | 1/1970 | Nash |
| 3,608,928 A | 9/1971 | Hooker |
| 3,707,804 A | 1/1973 | Cook |
| 3,711,146 A | 1/1973 | Madzsar |
| 3,852,965 A | 12/1974 | Rudd |
| 3,859,797 A | 1/1975 | Ayers |
| 4,006,932 A | 2/1977 | McDonald |
| 4,045,962 A | 9/1977 | Preus |
| 4,060,268 A | 11/1977 | Page, Jr. |
| 4,103,918 A | 8/1978 | Salden |
| 4,104,884 A | 8/1978 | Preus |
| 4,142,755 A | 3/1979 | Keedy |
| 4,190,381 A | 2/1980 | Knaus et al. |
| 4,236,745 A | 12/1980 | Davis |
| 4,262,961 A | 4/1981 | Schmidt |
| 4,282,946 A | 8/1981 | MacGuire |
| 4,352,502 A | 10/1982 | Leonard et al. |
| 4,418,853 A * | 12/1983 | Shaffer .................. B62D 33/00 224/401 |
| 4,421,333 A | 12/1983 | Van Dyke |
| 4,544,094 A | 10/1985 | Scholey |
| 4,611,847 A | 9/1986 | Sullivan |
| 4,688,824 A | 8/1987 | Herring |
| 4,746,160 A | 5/1988 | Lviesemeyer |
| 4,877,266 A | 10/1989 | Lamparter et al. |
| 4,943,204 A | 7/1990 | Ehrlich |
| 4,989,782 A | 2/1991 | McKie |
| 5,058,945 A | 10/1991 | Elliott, Sr. et al. |
| 5,094,744 A | 3/1992 | Scovell |
| 5,152,228 A | 10/1992 | Donkin |
| 5,280,990 A | 1/1994 | Rinard |
| D354,726 S | 1/1995 | Fitzgerald et al. |
| 5,489,137 A | 2/1996 | Herrmeyer |
| 5,607,200 A | 3/1997 | Smidler |
| 5,673,953 A | 10/1997 | Spease |
| 5,823,531 A | 10/1998 | Huber |
| 5,823,610 A | 10/1998 | Ryan et al. |
| 5,921,617 A | 7/1999 | Loewen et al. |
| 6,079,769 A | 6/2000 | Fannin et al. |
| 6,089,629 A | 7/2000 | Hope et al. |
| 6,092,861 A | 7/2000 | Whelan |
| 6,109,675 A | 8/2000 | Sumrall |
| 6,116,667 A | 9/2000 | Torcomian |
| 6,257,654 B1 | 7/2001 | Boivin et al. |
| 6,286,894 B1 | 9/2001 | Kingham |
| 6,309,010 B1 | 10/2001 | Whitten |
| 6,409,252 B1 | 6/2002 | Andrus |
| 6,443,492 B1 | 9/2002 | Barr et al. |
| 6,467,833 B1 | 10/2002 | Travers |
| 6,485,087 B1 | 11/2002 | Roberge et al. |
| 6,595,578 B1 | 7/2003 | Calsoyds et al. |
| 6,626,475 B2 | 9/2003 | Schroeder |
| 6,641,206 B1 | 11/2003 | Bergstrom et al. |
| 6,644,720 B2 | 11/2003 | Long et al. |
| 6,666,498 B1 | 12/2003 | Whitten |
| 6,742,835 B1 | 6/2004 | Floarea |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,959,958 B2 | 11/2005 | Basford |
| 6,969,106 B1 * | 11/2005 | Hankel .................. B60J 7/102 296/100.18 |
| 6,974,166 B2 | 12/2005 | Ledford et al. |
| 6,974,178 B2 | 12/2005 | Ortega et al. |
| 7,059,819 B2 | 6/2006 | Brackmann et al. |
| 7,086,674 B2 | 8/2006 | Goertz |
| 7,093,889 B2 | 8/2006 | Graham |
| 7,134,820 B2 | 11/2006 | Ehrlich |
| 7,147,270 B1 | 12/2006 | Andrus et al. |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,431,381 B2 | 10/2008 | Wood |
| 7,497,502 B2 | 3/2009 | Wood |
| 7,537,270 B2 | 5/2009 | OGrady |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,887,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,186,745 B2 | 5/2012 | Graham et al. |
| 8,191,956 B1 | 6/2012 | Dixon, Jr. et al. |
| 8,210,599 B2 | 7/2012 | Butler |
| 8,292,351 B2 | 10/2012 | Boivin et al. |
| 8,303,025 B2 | 11/2012 | Senatro |
| 8,376,450 B1 | 2/2013 | Long et al. |
| 8,382,194 B2 | 2/2013 | Wood |
| 8,398,150 B2 | 3/2013 | Brown et al. |
| 8,408,570 B2 | 4/2013 | Heppel et al. |
| 8,496,286 B1 | 7/2013 | Katz et al. |
| 8,540,304 B2 | 9/2013 | Kint |
| 8,579,359 B2 | 11/2013 | Brown et al. |
| 8,608,122 B2 | 12/2013 | Mancina et al. |
| 8,616,616 B2 | 12/2013 | van Raemdonck |
| 8,783,758 B2 | 7/2014 | Baker |
| 8,801,078 B2 | 8/2014 | Brown et al. |
| 8,857,893 B2 | 10/2014 | Reiman et al. |
| 8,899,660 B1 | 12/2014 | Praskovskaya et al. |
| 8,973,973 B2 | 3/2015 | Kronemeyer |
| 8,979,172 B2 | 3/2015 | Reiman et al. |
| 8,985,677 B2 | 3/2015 | Wiegel |
| 9,004,575 B2 | 4/2015 | Grandominico et al. |
| 9,045,176 B1 | 6/2015 | Henderson, II |
| 9,139,241 B1 | 9/2015 | Smith |
| 9,199,673 B2 | 12/2015 | Baker |
| 9,199,676 B2 | 12/2015 | Brown et al. |
| 9,211,919 B2 | 12/2015 | Senatro |
| 9,296,433 B2 | 3/2016 | Roush |
| 9,308,949 B1 | 4/2016 | Mihelic et al. |
| 9,340,240 B2 | 5/2016 | Clark |
| 9,352,714 B2 | 5/2016 | Batzer et al. |
| 9,463,759 B1 | 10/2016 | Kiefer |
| 9,487,171 B2 | 11/2016 | Rogers et al. |
| 9,487,245 B2 | 11/2016 | Sjoberg et al. |
| 9,506,488 B2 | 11/2016 | Mancina et al. |
| 9,573,636 B2 | 2/2017 | Grandominico et al. |
| 9,669,883 B2 | 6/2017 | Bassily et al. |
| 9,908,493 B1 | 3/2018 | Kiefer |
| 9,957,991 B2 | 5/2018 | Mancina et al. |
| 2003/0178611 A1 | 9/2003 | Anderson |
| 2005/0040637 A1 | 2/2005 | Wood |
| 2005/0067204 A1 | 3/2005 | Rijsbergen et al. |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Petersen |
| 2006/0254182 A1 | 11/2006 | Cerasi et al. |
| 2007/0024086 A1 | 2/2007 | Shishikura |
| 2007/0037479 A1 | 2/2007 | Margay |
| 2007/0114757 A1 | 5/2007 | Vickroy |

(56) References Cited

U.S. PATENT DOCUMENTS

| | | |
|---|---|---|
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2008/0265049 A1 | 10/2008 | Stadlbauer |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1* | 10/2010 | Brown .......... B62D 25/168 296/180.4 |
| 2010/0264691 A1 | 10/2010 | Giromini et al. |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0074728 A1 | 3/2012 | Senatro |
| 2012/0091754 A1 | 4/2012 | Lee et al. |
| 2012/0169086 A1 | 7/2012 | Giromini et al. |
| 2012/0200113 A1 | 8/2012 | Brown et al. |
| 2012/0235441 A1 | 9/2012 | Dayton |
| 2012/0319428 A1 | 12/2012 | Wood |
| 2013/0119701 A1 | 5/2013 | Dayton |
| 2013/0181477 A1 | 7/2013 | Reiman et al. |
| 2013/0270857 A1 | 10/2013 | Brown et al. |
| 2013/0285411 A1 | 10/2013 | Layfield et al. |
| 2014/0035318 A1 | 2/2014 | Brown et al. |
| 2014/0110968 A1 | 4/2014 | Henderson |
| 2014/0159419 A1 | 6/2014 | Baker et al. |
| 2014/0252799 A1 | 9/2014 | Smith |
| 2014/0333089 A1 | 11/2014 | Brown et al. |
| 2015/0175221 A1 | 6/2015 | Popa |
| 2015/0259014 A1 | 9/2015 | Baker et al. |
| 2015/0336621 A1* | 11/2015 | Godon ............ B62D 29/04 296/203.01 |
| 2016/0068202 A1 | 3/2016 | Senatro |
| 2016/0096558 A1 | 4/2016 | Bassily et al. |
| 2016/0121940 A1 | 5/2016 | Courtney et al. |
| 2016/0152285 A1 | 6/2016 | Wiegel |
| 2016/0244108 A1 | 8/2016 | Tsuruta et al. |
| 2016/0368443 A1 | 12/2016 | Theethira Kushalappa et al. |
| 2017/0015369 A1 | 1/2017 | Senatro |
| 2018/0118143 A1 | 5/2018 | Ponder |
| 2018/0187708 A1 | 7/2018 | Mancina et al. |
| 2018/0304941 A1* | 10/2018 | Ehrlich ............ B62D 35/001 |

FOREIGN PATENT DOCUMENTS

| | | |
|---|---|---|
| CA | 2795076 A1 | 5/2013 |
| CA | 2810007 A1 | 9/2013 |
| CA | 2812316 A1 | 10/2013 |
| CA | 2860351 A1 | 2/2015 |
| CA | 2905596 A1 | 4/2016 |
| DE | 334664 C | 9/1921 |
| DE | 454156 C | 1/1928 |
| DE | 1291221 B | 3/1969 |
| DE | 1603529 A1 | 7/1971 |
| DE | 2064239 A1 | 7/1972 |
| DE | 2135202 A1 | 2/1973 |
| DE | 3121565 A1 | 12/1982 |
| DE | 3402586 A1 | 8/1985 |
| DE | 19606921 A1 | 8/1997 |
| DE | 10157838 A1 | 10/2002 |
| DE | 102012018487 A1 | 3/2014 |
| EP | 0738621 A1 | 10/1996 |
| EP | 0780268 A1 | 6/1997 |
| EP | 0857620 A1 | 8/1998 |
| EP | 2581509 A2 | 4/2013 |
| FR | 2482548 A1 | 11/1981 |
| GB | 912610 A | 12/1962 |
| JP | 2007223359 A | 9/2007 |
| KR | 20110059021 | 6/2011 |
| NL | 1034363 C2 | 2/2009 |
| WO | 9748590 A1 | 12/1997 |
| WO | 03093066 A1 | 11/2003 |
| WO | 2004020268 A1 | 3/2004 |
| WO | 2005085009 A1 | 9/2005 |
| WO | 2008147218 A2 | 12/2008 |
| WO | 2009051551 A1 | 4/2009 |
| WO | 2013091232 A1 | 6/2013 |
| WO | 2014083376 A1 | 6/2014 |

OTHER PUBLICATIONS

Final Office Action issued in corresponding U.S. Appl. No. 13/413,998, dated Nov. 2, 2012, 7 pages.
Non-Final Office Action issued in corresponding U.S. Appl. No. 13/413,998, dated Jul. 10, 2012, 6 pages.
Non-Final Office Action issued in corresponding U.S. Appl. No. 13/448,931, dated Jun. 29, 2012, 12 pages.
Non-Final Office Action issued in corresponding U.S. Appl. No. 13/741,639, dated Apr. 5, 2013, 10 pages.
Non-Final Office Action issued in corresponding U.S. Appl. No. 13/847,111, dated Nov. 5, 2013, 5 pages.
Non-Final Office Action issued in corresponding U.S. Appl. No. 14/049,851, dated Dec. 31, 2013, 11 pages.
Non-Final Office Action issued in corresponding U.S. Appl. No. 14/100,071, dated Mar. 26, 2015, 21 pages.
Non-Final Office Action issued in corresponding U.S. Appl. No. 14/321,977, dated Apr. 3, 2015, 12 pages.
Non-Final Office Action issued in corresponding U.S. Appl. No. 14/457,222, dated Jun. 26, 2017, 10 pages.
Non-Final Office Action issued in corresponding U.S. Appl. No. 14/644,508, dated Nov. 10, 2015, 16 pages.
Final Office Action issued in corresponding U.S. Appl. No. 14/923,610, dated Dec. 13, 2016, 7 pages.
Non-Final Office Action issued in corresponding U.S. Appl. No. 14/923,610, dated Aug. 31, 2016, 7 pages.
Non-Final Office Action issued in corresponding U.S. Appl. No. 15/200,628, dated Jun. 30, 2017, 8 pages.
Non-Final Office Action issued in corresponding U.S. Appl. No. 15/252,377, dated Nov. 2, 2017, 12 pages.
International Search Report and Written Opinion issued in corresponding International Application No. PCT/US2010/031173, dated Jun. 14, 2010, 13 pages.
"AeroFlex Fairing™ product info page" Freight Wing Incorporated, 1 page. Retrieved from Internet on Jul. 7, 2010. http://www.freightwing.com/aeroflex96.htm.
"Belly Fairing™ product info page" Freight Wing Incorporated, 2 pages. Retrieved from Internet on Jul. 7, 2010. http://www.freightwing.com/belly%20fairing.html.
"Freight Wing Chassis Belly Fairing product info page" Freight Wing Incorporated, 1 page. Retrieved from Internet on Jul. 7, 2010. http://www.freightwing.com/chassis.htm.
"Innovative Side Skirt Designs From Utility—A New Patent Pending Solution" 2010 Utility Trailer Manufacturing, Utility Brochure, www.utilitytrailer.com, 2 pages.
"LCL—Laydon Composites, Ltd.—Tractor Aerodynamics—Trailer Fairings" Feb. 7, 2009, 3 pages. Retrieved on Feb. 5, 2019. http://web.archive.org/web/20090207195226/http://www.laydoncomp.com/trailer-skirts.php.
"Low Rider Belly Fairing product info page" Freight Wing Incorporated, 1 page. Retrieved from Internet on Jul. 7, 2010. http://www.freightwing.com/lowrider.htm.
"MFS Skirt, Maximum Flex Skirt" Transtex Composite, 2 pages (undated material).

(56) References Cited

OTHER PUBLICATIONS

"Nu-Line® Introducing Nu-Line Aerodynamic Trailer Skirts" 2014 Nu-Line Products Inc., Brochure NLTS-0314, 2 pages.
"Side Skirt Fairing: Options | Aeroefficient—Aerodynamic Solution for the Trucking Industry", 2010 Aeroefficient, 12 pages. Retrieved from Internet on Jul. 7, 2010. http://www.aerofficient.com/side-options.html.
"Strehl—Trailer Blade Documents" Model 715 Advance Aerodynamic Trailer Skirt, 2009-2010 Strehl LLC., 5 pages. Retrieved from Internet on Jul. 7, 2010. http://strehlusa.com/products/trailerbladedocuments.html.
"Takler" 2009 Product catalog for Takler Srl, 31 pages.
"Trailer Fairings" Laydon Composites Ltd., 3 pages. Retrieved from Internet on Jul. 7, 2010. http://www.laydoncomp.cm/trailer-skirts.php.
"Trailerskirt™ Assembly Instructions" Jun. 12, 2009 Rev. 8.0 supersedes all other version, Property of LCL, LCL-ENG-045, 7 pages.
"Windyne—Truck Fuel Savings, Aerodynamic Fairing, Aerodynamic Parts, Truck Industry" 2008 Windyne Corp, 2 pages. Retrieved from Internet on Jul. 7, 2010. http://www.windyne.com/features-functions.htm.

\* cited by examiner

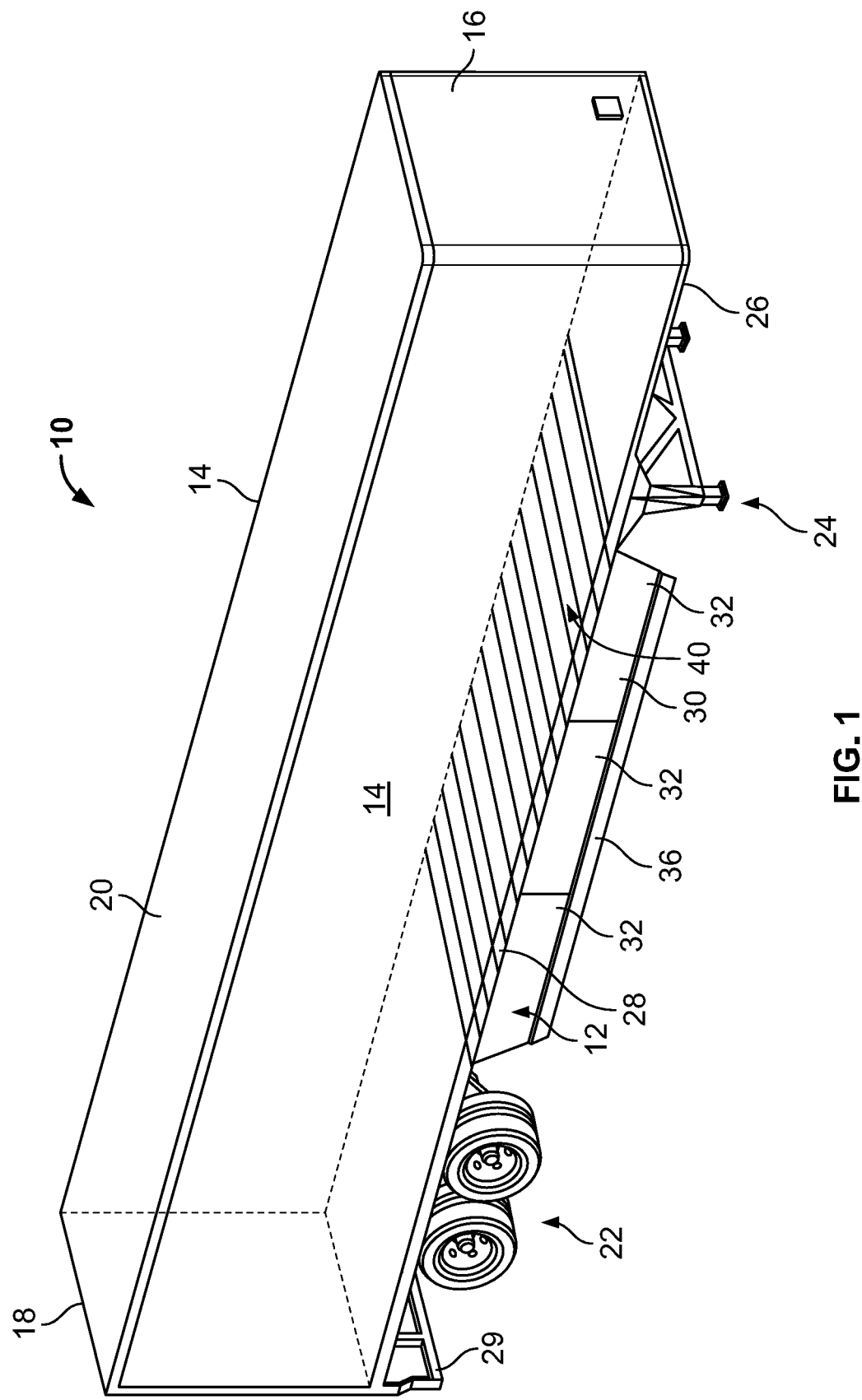

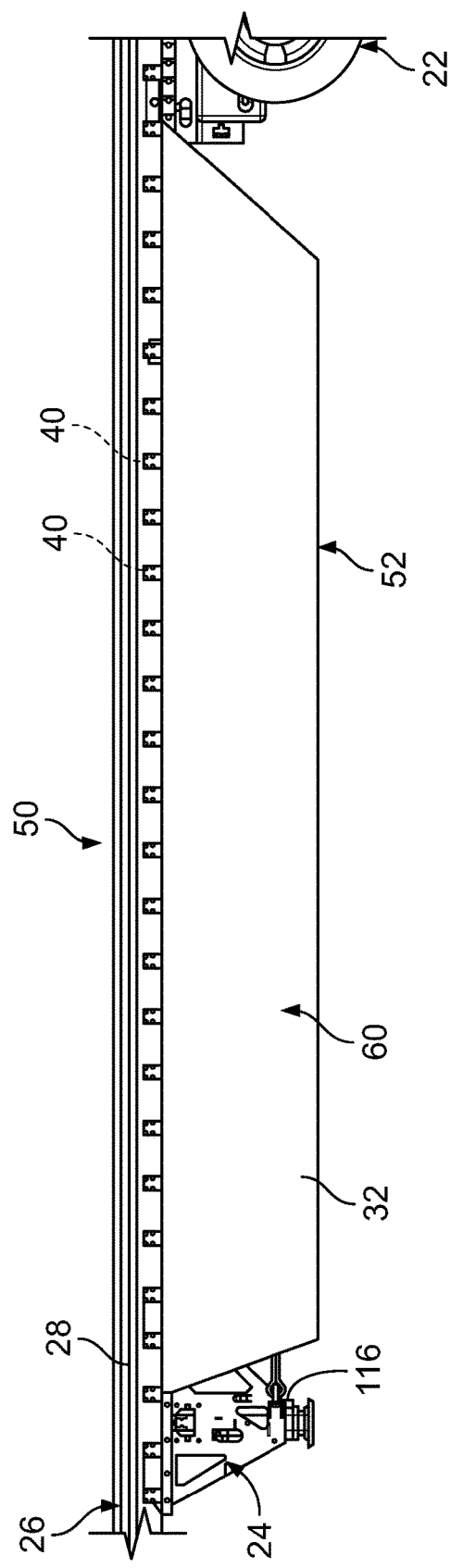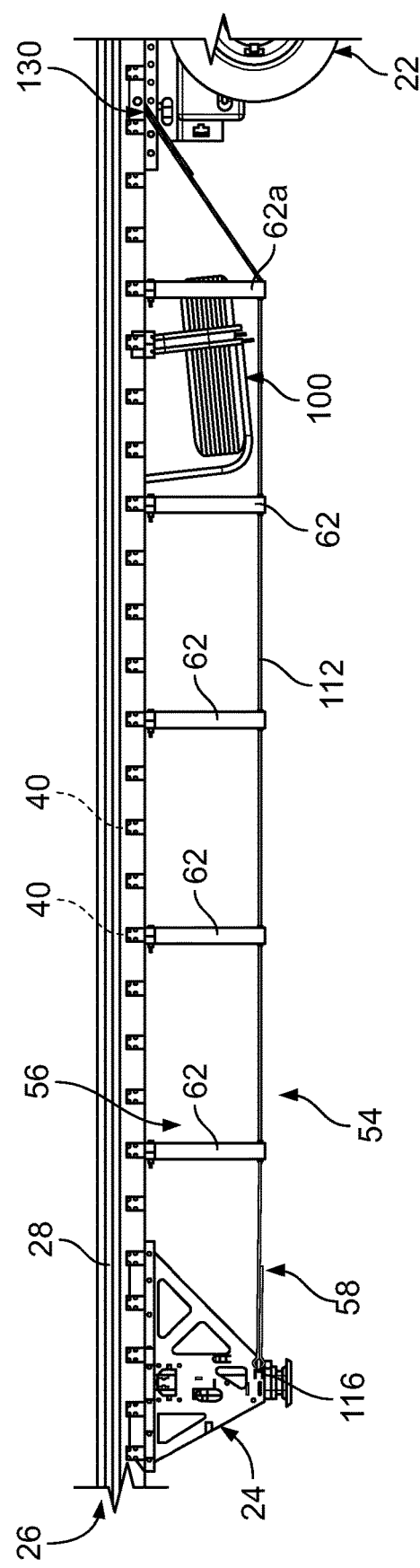

SIDE UNDERRIDE GUARD

CROSS REFERENCE TO RELATED APPLICATION

This application claims the benefit of U.S. Provisional Application No. 62/633,313 filed on Feb. 21, 2018, which is incorporated herein by reference in its entirety.

FIELD OF THE INVENTION

The present invention relates generally to semi-trailers, such as van-type trailers, for example. In particular, the present invention relates to both an aerodynamic side skirt system for reducing drag on such a trailer as well as a side underride system for preventing or reducing the extent to which an automobile may ride under the trailer in the event of a side impact collision, for example.

BACKGROUND

To reduce wind flow resistance and drag on a trailer, truck, semi-trailer, or other vehicle, side skirts that extend downwardly from a bottom of the trailer and/or chassis toward the roadway to partially enclose the floor assembly and undercarriage have been utilized.

Air flow passing under a ground vehicle imparts a drag force to the vehicle when it impinges on and flows around the vehicle undercarriage components attached to or a part of the underside of a vehicle. Side skirt systems are designed to prevent or control the flow of air from entering the undercarriage region from a side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and/or alternative fuel-based vehicles, for example.

Trailers typically have a higher elevation than passenger vehicles. The higher elevation presents a risk that a passenger vehicle may underride the trailer in an accident, potentially resulting in damage to the underriding vehicle and injury to occupants therein. Accordingly, a side protection device, or underride guard, may be provided for use with a trailer in order to reduce the risk of such passenger vehicles underriding the trailer. Side protection devices are intended to reduce the extent to which a "passenger vehicle" (as defined in 49 C.F.R. Part 571) can intrude under the side of a trailer, diminishing passenger compartment intrusion.

SUMMARY

The present disclosure may comprise one or more of the following features and combinations thereof.

According to one embodiment of the present disclosure, a side underride system configured to be coupled to a trailer is provided. The side underride system comprises a first skirt wall, a second skirt wall, and a support system. The first skirt wall is configured to be positioned below the trailer near a first side wall of the trailer to reduce airflow under the trailer. The second skirt wall is configured to be positioned below the trailer near a second side wall of the trailer to reduce airflow under the trailer. The support system is configured to be positioned below the trailer and between the first skirt wall and the second skirt wall to provide side underride protection. The support system includes a plurality of cross-braces and a cable system. The plurality of cross braces extend at least partially across a width of the trailer and include a front cross-brace, a middle cross-brace, and a rear cross brace. The cable system includes a cable engaged with the plurality of cross-braces.

In some embodiments, the cable is routed through the plurality of cross-braces.

In some embodiments, the cable is coupled to the plurality of cross-braces.

In some embodiments, the support system includes a cable clamp configured to couple the cable to one of the plurality of cross-braces.

In some embodiments, each of the plurality of cross-braces includes a vertical post and a truss beam, and the cable clamp is configured to be coupled to one of the vertical post and the truss beam.

In some embodiments, the cable clamp is configured to be coupled to the plurality of cross-braces to route the cable one of beside and below the vertical post.

In some embodiments, the side underride system further includes a plurality of brackets configured to couple each of the plurality of cross-braces to a floor assembly of the trailer.

In some embodiments, each of the plurality of brackets are coupled to a bottom surface of a cross member of the floor assembly.

In some embodiments, each of the plurality of cross-braces includes a vertical post, and each vertical post is configured to be coupled to one of the plurality of brackets.

According to another embodiment, a side underride system configured to be coupled to a trailer is disclosed. The side underride system comprises a support system configured to be positioned below the trailer to provide side underride protection. The support system includes a cable system and a brace system. The cable system is configured to couple to the trailer. The brace system includes a plurality of cross-braces that each extend at least partially across a width of the trailer, are spaced apart at intervals along a length of the trailer, and are configured to capture the cable system.

In some embodiments, the cable system includes a cable, the plurality of cross-braces each include a cable clamp configured to engage with the cable, and each cable clamp includes a bracket coupled to a truss beam of the cross brace and a rope clip engaged with the bracket and configured to capture the cable.

In some embodiments, the side underride system also includes a skirt system configured to be positioned below the trailer to reduce airflow under the trailer and the support system is positioned between the skirt system.

According to a further embodiment, a side underride support subassembly is disclosed. The side underride support subassembly includes a cross brace and a first and second cable clamps. The cross-brace includes first and second vertical posts and first and second truss beams. The first and second vertical posts are opposite one another. The first and second truss beams are connected to the first and second vertical posts. The first and second truss beams diagonally cross one another. The first and second cable clamps are connected to the cross-brace.

In some embodiments, the first cable clamp is connected to the first vertical post and the second cable clamp is connected to the second vertical post.

In some embodiments, one or more of the first and second cable clamps extend outwardly from the cross-brace.

In some embodiments, one or more of the first and second cable clamps extend downwardly from the cross-brace.

In some embodiments, one or more of the first and second vertical posts defines a recess and one or more of the cable clamps is connected to the cross brace inboard of the recess.

In some embodiments, one or more of the first and second vertical posts has a closed face and an outwardly-facing side and the recess is defined in a lower portion of the closed face inboard of the outwardly-facing side.

In some embodiments, the first cable clamp is connected to the first truss beam; and the second cable clamp is connected to the second truss beam.

In some embodiments, each of the first and second cable clamps includes a bracket connected to the cross brace, and a rope clip connected to the first bracket and configured to compress a cable toward the bracket.

In some embodiments, the cable clamp is below the vertical support.

In some embodiments, one or more of the first and second vertical posts has an outwardly-facing side, and the cable clamp is inboard of the outwardly-facing side.

These and other features of the present disclosure will become more apparent from the following description of the illustrative embodiments.

BRIEF DESCRIPTION OF THE DRAWINGS

FIG. 1 is an isometric view of a trailer including rear wheels, a landing gear, and a side underride system including an aerodynamic side skirt system;

FIG. 2 is a side view of the side underride system of FIG. 1;

FIG. 3 is a side view of the side underride system of FIGS. 1 and 2 with the aerodynamic side skirt system of FIGS. 1 and 2 removed to show a support system of the side underride system;

DETAILED DESCRIPTION

Figure 4:
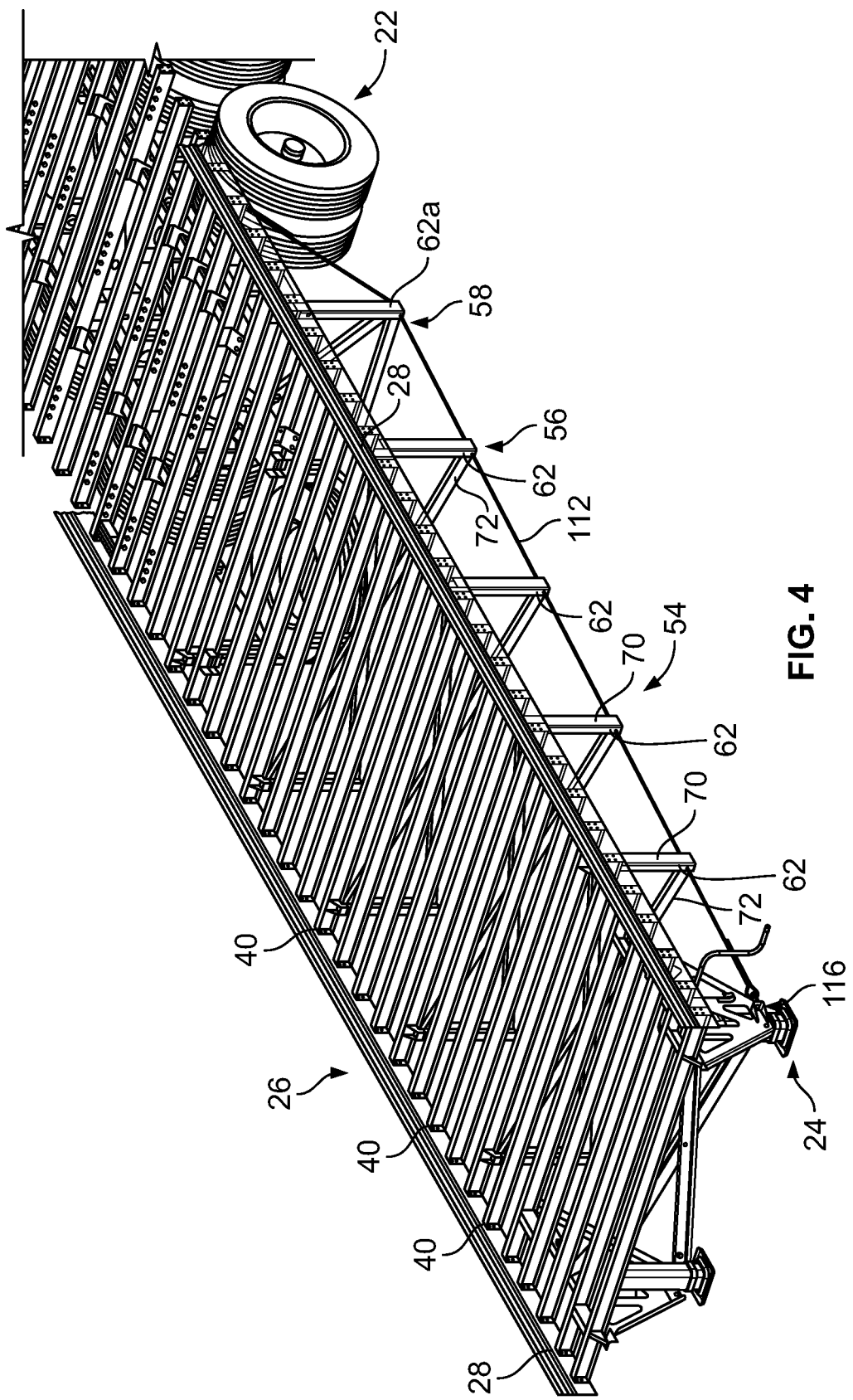
FIG. 4 is a partial isometric view of the side underride system of FIGS. 1-3 with the side skirt system of FIGS. 1 and 2 removed to show the support system of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

For the purposes of promoting an understanding of the principles of the invention, reference will now be made to a number of illustrative embodiments shown in the attached drawings and specific language will be used to describe the same. While the concepts of this disclosure are described in relation to a box-type trailer, it will be understood that they are equally applicable to many types of trailers, semi-trailers, and tanks generally, and more specifically to conventional flat-bed trailers, box or van type trailers, and/or pup trailers, as well as straight truck bodies, small personal and/or commercial trailers and the like. Furthermore, while the concepts of this disclosure may be described in relation to a box-type trailers, it will be understood that that they are equally applicable to other trailers generally and any type of over-the-road storage container. Accordingly, those skilled in the art will appreciate that the present invention may be implemented in a number of different applications and embodiments and is not specifically limited in its application to the particular embodiments depicted herein.

Generally, some embodiments of the disclosure provide an integrated system of an aerodynamic side skirt and side underride protection in one common system. The system incorporates both an aerodynamic side skirt for reducing air drag on a trailer and a side underride guard for preventing or reducing the extent to which a vehicle may ride under the trailer, as well as preventing or reducing the extent to which a trailer body may intrude into the passenger compartment of the vehicle. In some embodiments, there is no clear division between the skirt and the guard; in other embodiments, the side underride guard may be retrofit with existing skirt systems; in yet other embodiments, the side underride guard may be a standalone system without a skirt. Generally, the systems described herein can help generate a retardation or restriction force to decelerate an impacting vehicle and absorb the vehicle's kinetic energy to prevent or reduce passenger compartment intrusion (PCI).

FIG. 1 depicts a trailer 10 including an aerodynamic skirt system or assembly 12 coupled to and extending downwardly from each side wall 14 of the trailer 10. Illustratively, the skirt system 12 operates to improve the aerodynamic efficiency of the trailer 10 by reducing drag and wind flow under the trailer 10. In particular, the skirt system 12 operates to reduce airflow under the trailer 10 while the trailer 10 is traveling down a road (e.g., being towed by a tractor, as a tractor/trailer combination). Reduction of airflow under the trailer 10 may increase the fuel efficiency, or the efficiency of any other such source of vehicle drive power, of the tractor/trailer combination. Illustratively, the skirt system 12, as well as other skirt systems described herein, extends below a side wall 14 of the trailer 10 at least partially along a length of the trailer. In particular, in some embodiments, the skirt system 12 extends generally between a landing gear 24 and a rear wheel assembly 22 of the trailer 10. However, the skirt systems described herein may be modified to extend along a greater or a lesser length of the trailer 10 than what is illustratively shown in the figures. In other words, the skirt systems disclosed herein may be modified to extend along the entire, or substantially the entire, length of the trailer 10 or may be modified to extend along only a small portion of the length of the trailer 10. Further, any of the skirt systems disclosed herein may be for structural and/or aerodynamic purposes.

As shown in FIG. 1, the trailer 10 includes side walls 14, a front end wall 16, a rear end wall 18, and a roof 20 defining an inside storage portion (not shown) able to store various articles or goods therein. The trailer 10 further includes the rear wheel assembly 22 and the front support or landing gear 24 each coupled to a bottom wall or floor assembly 26 of the trailer 10. Illustratively, the floor assembly 26 of the trailer 10 includes various laterally-extending cross members 40 and right and left base rails 28 coupled to the cross members 40 and extending along a length of the trailer 10. In some embodiments, the front end of the trailer 10 is configured to be coupled to a tractor (not shown) for towing the trailer 10 thereon, thus providing a tractor-trailer assembly. In other embodiments, a cab is integral with the storage compartment, for example, in refrigerated and dry truck bodies. Illustratively, while the specific trailer 10 is shown and described herein, other trailers including other components, such as composite floor assemblies, for example, which may or may not include any cross members 40 are contemplated as well.

As shown in FIG. 1, the skirt system 12 is coupled to the floor assembly 26 of the trailer 10 and extends downwardly from the base rail 28 of the trailer 10. Illustratively, the side skirt system 12 is positioned between the rear wheel assembly 22 and the front support 24 in order to prevent air from flowing laterally under the floor assembly 26 of the trailer 10 as the trailer 10 is towed by a tractor. It should be understood that while the aerodynamic side skirt system 12 is shown for use with a trailer 10, the side skirt system 12 and/or side underride guards disclosed herein may be coupled to any vehicle to reduce the drag thereon. Still further, while the embodiments disclosed herein are shown as being utilized with trailers, any of the embodiments disclosed herein may be coupled to any vehicle.

It should be noted that the trailer 10 of FIG. 1 includes two aerodynamic skirt systems 12. In particular, one system 12 is coupled to one side of the floor assembly 26 of the trailer 10 to extend downwardly from the floor assembly 26 generally parallel to the corresponding side wall 14 of the trailer 10, while the other system 12 is coupled to the other side of the floor assembly 26 to extend downwardly from the floor assembly 26 generally parallel to the corresponding side wall 14 of the trailer 10. In other words, a first skirt system 12 is configured to be positioned below the trailer 10 near a first side wall 14, and a second skirt system 12 is configured to be positioned below the trailer 10 near a second side wall 14. For purposes of the description herein, only one skirt system 12 will be described. However, it should be understood that the two skirt systems 12 of the trailer 10 are substantially identical or identical in configuration and function. Also, while the skirt systems 12 are shown as being parallel to the corresponding side walls 14, the skirt systems 12 may be angled or curved inwardly or outwardly relative to the side walls 14 at forward (toward the tractor) ends thereof, as further described below. In yet other embodiments, any suitable skirt system may be utilized.

Generally, the skirt system 12 may include a side skirt wall 30 provided in the form of one or more wall panels 32. For example, as shown in FIG. 1, the side skirt wall 30 may include three wall panels 32 coupled to each other. The wall panels 32 may be secured to each other and/or to the trailer 10 by one or more mounting bracket assemblies and/or other coupling mechanisms. The mounting bracket assemblies and/or other coupling mechanisms may include, but are not limited to, those structures described in U.S. Pat. No. 8,162,384, the entire content of which is incorporated herein by reference. Additionally, while the illustrated skirt system 12 includes three wall panels 32, it is within the scope of this disclosure to provide a skirt system 12 having any number of wall panels 32, or a single, unitary wall panel 32 (e.g., as shown in FIG. 2).

In some embodiments, the mounting bracket assemblies or other coupling mechanisms may allow the skirt system 12 to tilt laterally both inwardly and outwardly relative to the floor assembly 26 of the trailer 10, for example, for the skirt wall 30 to potentially avoid damage when the trailer 10 traverses into or over a fixed, immovable obstacle. In other embodiments, however, the skirt system 12 may be sufficiently rigidly mounted to the floor assembly 26 such that the skirt system 12 is generally prevented from tilting under normal wind and road air forces. Additionally, as shown in FIG. 1, the skirt system 12 may further include a flexible flap 36 (or multiple flexible flaps) coupled to the bottom edge of the wall panels 32 to provide additional airflow resistance. The flexible flap 36 may also prevent damage to the skirt wall 30 by being configured to bend or flex in response to forces applied vertically, such as in situations where the trailer 10 may traverse over a curb or railroad track where the road surface is not flat.

Illustratively, each wall panel 32 is made of a composite material. For example, the composite material may include a plastic core and metal outer skins coupled to the plastic core. Such a composite material provides a rigid, but lightweight and durable material. Illustratively, for example, each wall panel 32 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may alternatively or additionally be used. For example, the wall panels 32 may be made of a sandwich composite including a honeycomb core and metal or plastic outer sheets, or the wall panels 32 may be made of a rigid or semi-rigid fiber-reinforced plastic composite. Further, the wall panels 32 may be of any number of suitable, non-composite materials such as metals, metal alloys, and/or plastics, for example.

In some embodiments, the above skirt system 12 may be structurally reinforced to provide additional side protection that may reduce the risk of an automobile underriding the trailer 10. For example, the skirt system 12 may be combined with a rigid and/or compressible support system 54 positioned underneath the trailer 10 and between the side skirt walls 30. As shown in FIGS. 2-7, a support system 54 is provided under the floor assembly 26 of the trailer 10 to form a side underride system 50. This combination skirt system 12 and support system 54 can thus provide dual functions of potentially improving aerodynamic efficiency and providing side underride protection. Alternatively, some support systems described herein may form standalone side underride systems that operate to provide side underride protection without a skirt system.

In some instances, the support system 54 may be retrofit into existing skirt systems 12 or installed with new skirt systems 12 or additional aerodynamic systems other than what is herein described. Alternatively, the support system 54 alone (that is, without a skirt system) may form the side underride system 50. In other words, the support system 54 may be an OEM side underride system design (that is, not for use as a retrofit with an existing skirt system) or, alternatively, may be used as a retrofit with existing skirt systems. For example, the support system 54 alone may potentially improve aerodynamic efficiency (i.e., by reducing air flow under the trailer 10) and may provide side underride protection. In particular, side underride systems may be contemplated within the scope of this disclosure to include side skirts or any other structures of any configuration and shape to provide a first outer surface positioned below the trailer 10 near the first side wall 14 and a second outer surface positioned below the trailer 10 near the second side wall 14 to reduce airflow under the trailer, where the surfaces permit any of the structures described herein to be positioned therebetween to potentially provide side underride protection.

Referring now to FIGS. 2-5, according to one illustrative embodiment, a side underride system 50 may include a skirt system 52 and a support system 54 with a brace system 56 and a cable system 58. While the skirt system 52 may provide aerodynamic properties, the brace system 56 is designed to provide resistance generally perpendicular to, or at other angles relative to, the side walls 14, and the cable system 58 may provide stability to the brace system 56 and additional strength generally parallel to the side walls 14.

Illustratively, the skirt system 52 is coupled to the floor assembly 26 of the trailer 10 to extend downwardly from the side wall 14 and the base rail 28 at least partially along a length of the trailer 10. In some embodiments, as shown in FIG. 2, the skirt system 52 is positioned generally between the rear wheel assembly 22 and the landing gear 24 in order to prevent air from flowing laterally under the floor assembly 26 as the trailer 10 is towed by a tractor. In one specific application, the length may be about 16 feet. However, the skirt system 52 (or other skirt systems described herein) may be modified to extend along a greater or a lesser length of the trailer 10 than what is illustratively shown in the figures. In other words, the skirt systems disclosed herein, or the side underride systems or support systems disclosed herein, may be modified to extend along the entire, or substantially the entire, length of the trailer 10 (such as from the landing gear 24 to a rear impact guard (not shown) extending downward from the rear end wall 18), or may be modified to extend along only a small portion of the length of the trailer 10.

As depicted in FIG. 2, the skirt system 52 includes a skirt wall 60. The skirt wall 60 may include similar structure and function as the skirt wall 30 described above. For example, the skirt wall 60 may be coupled to the floor assembly 26

(such as to the cross members 40 and/or the base rail 28) via one or more mounting bracket assemblies or other suitable coupling mechanisms, such as other suitable hinge(s), longitudinal straps, bars, and/or connectors. Additionally, in some embodiments, the base rail 28 may be modified to provide a direct coupling surface for the skirt wall 60. For example, the base rail 28 may extend further downward past the cross members 40 to provide a suitable surface to which the skirt wall 60 may be coupled.

Furthermore, the skirt wall 60 may include a single, substantially rigid or semi-rigid flat or curved wall panel 32, or multiple wall panels 32 coupled together. Generally, with respect to the integrated underride and skirt systems disclosed herein, the skirt wall 60 may be of any configuration and shape to form a uniform surface optimized to control air flow around the trailer sides to minimize the air drag on the trailer 10. In other words, the skirt wall 60, or any other structure, may be of any configuration and shape to provide a first outer surface positioned below the trailer 10 near the first side wall 14 and a second outer surface configured to be positioned below the trailer 10 near the second side wall 14 to reduce airflow under the trailer 10, where the surfaces permit any of the structures described herein to be positioned therebetween to provide side underride protection.

Illustratively, the skirt wall 60 may be made of any material to minimize weight, cost, and aid in equipment assembly, servicing, and maintenance. Example skirt wall materials, for use with any of the skirt walls described herein, may include, but are not limited to, DURAPLATE® composite panels, a continuous composite laminate, a molded composite sandwich panel (MCS) including a lightweight core and laminate webbing sandwiched between laminate outer skins, a metallic material sheet (such as an aluminum sheet), etc. Other suitable composite materials may alternatively or additionally be used, including, but not limited to, a sandwich composite including a honeycomb core and metal or plastic outer sheets, or a rigid or semi-rigid fiber-reinforced plastic composite. Further, the skirt wall 60 may be of any number of suitable, non-composite materials such as metals, metal alloys, and/or plastics, for example. Further, the skirt may include a textile or fabric such as a canvas or reinforced canvas that may be stretched and attached to the support system 54. However, any material may be used to form a substantially continuous aerodynamic surface with suitable strength to be an integral part of the side underride system 50, as well as to form suitable connections to the trailer 10. Additionally, the skirt wall 60, or any skirt wall described herein, may be substantially rigid or substantially flexible.

Figure 5:
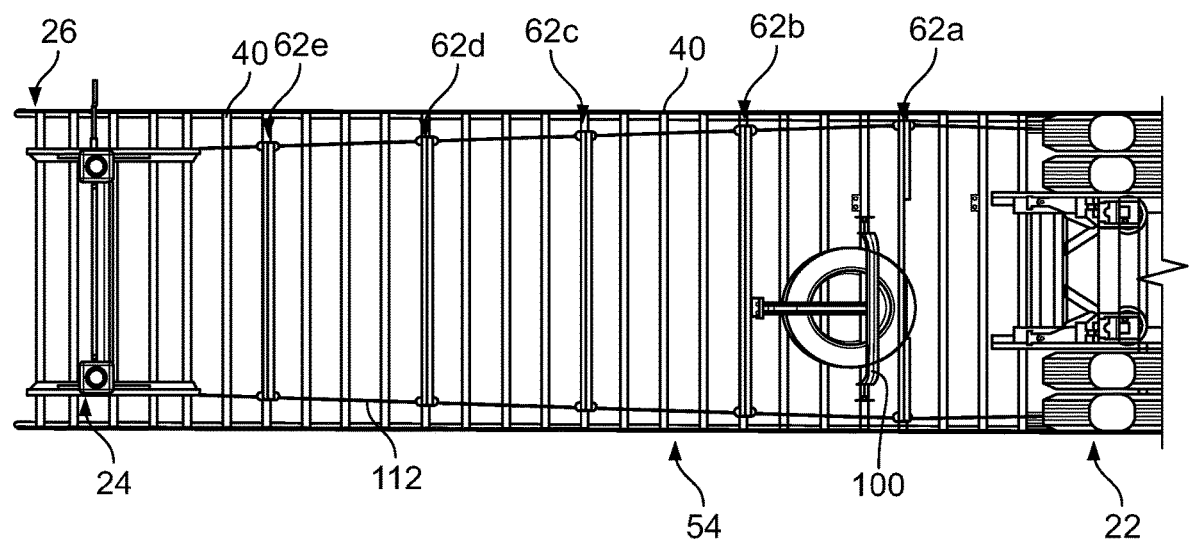
FIG. 5 is a bottom elevational view of the side underride system of FIGS. 1-4 with the side skirt system of FIGS. 1 and 2 removed to show the support system of FIGS. 3 and 4.

With respect to the support system 54, generally, the brace system 56 may be substantially rigid and arranged perpendicular to the side wall 14, and the cable system 58 may be coupled to a lower portion of the brace system 56 to limit movement of and help transfer loads across the brace system 56. More specifically, as shown in FIGS. 3-5, the brace system 56 may include a plurality of first example cross-braces 62 that may provide side underride protection. The plurality of first example cross-braces 62 may be coupled to the floor assembly 26 along a length of the trailer 10, each oriented substantially vertically and spaced apart with respect to each other.

With further reference to the brace system 56, each of the first example cross-braces 62 may be a separate subassembly unit of the support system 54 and spaced apart along a length of the trailer 10, for example, between the landing gear 24 and the rear wheel assembly 22, as shown in FIGS. 3-5, to provide impact protection along that length. Alternatively, the cross-braces 62 may span across the entire, or substantially the entire, length of the trailer 10 (such as from the landing gear 24 to the rear impact guard 29 or rear end of the trailer). In some embodiments, the cross-braces 62 may be spaced apart along a length equal to a length of the skirt wall 60. Alternatively, the cross-braces 62 may be spaced apart along a length less than or more than the length of the skirt wall 60. Additionally, the cross-braces 62 may extend downwardly from the floor assembly 26 far enough to provide substantial side impact protection, but still permit the trailer 10 to clear obstacles on a roadway. For example, in one application, the cross-braces 62 may extend downwardly from the floor assembly 26 so that a ground clearance from the bottom of the cross-braces 62 is approximately 16 inches to approximately 22 inches.

Illustratively, the cross-braces 62 may be spaced apart at specific intervals to increase the chances that a passenger vehicle colliding with the skirt wall 60 will engage at least one of the cross-braces 62 upon impact to prevent the vehicle from moving under the trailer 10. More specifically, to potentially increase the chances that a passenger vehicle colliding with a skirt wall 60 will engage at least one of the cross-braces 62 upon impact, the cross-braces 62 may be spaced apart along the length of the trailer 10 at intervals less than an average car width.

In one example, as shown in FIG. 5, the side underride system 50 may include first, second, third, fourth, and fifth cross-braces 62a, b, c, d, e spaced apart at approximately four-foot (1.2 meter) intervals, with the forward-most cross-brace 62e located adjacent, or at, the landing gear 24 and the rearward-most cross-brace 62a located adjacent, or forward of, the rear wheel assembly 22. Notably, in some embodiments, the rearward-most cross-brace 62a may include a different structure that is configured to accommodate a spare tire carrier 100, as shown in FIGS. 3 and 5. Further, other cross-braces 62 may be provided with a mechanism to hold the spare tire carrier 100. In another example, the side underride system 50 may include four cross-braces spaced apart at five-foot intervals. It should also be noted that other interval widths (e.g., constant or variable) may be contemplated within the scope of this disclosure.

Furthermore, each of the cross-braces 62a-e extends across a width of the trailer 10. In some applications, all the cross-braces 62a-e span an entire width between side walls 14 of the trailer 10. In other applications, some or all of the cross-braces 62a-e span less than the entire width between side walls 14, and/or each of the cross-braces 62a-e spans the same or different widths. For example, in applications where each skirt wall 60 is coupled directly below and parallel to a respective side wall 14, the cross-braces 62a-e may each span the entire width between side walls 14 (e.g., about eight feet in one application). In applications where the skirt walls 60 form an angled or curved profile from the front of the trailer 10 to the rear of the trailer 10, as shown in FIG. 5, the cross-braces 62a-e may span varying widths (e.g., that increase from the front of the trailer 10 to the rear of the trailer 10, as shown in FIG. 5) so that each of the cross-braces 62a-e spans from one skirt wall 60 to the opposite skirt wall 60. As a result, the more forward cross-braces 62b-e are successively shorter in width than one another and the most rearward cross-brace 62a. Accordingly, in such applications, the brace system 56 does not run parallel to the side walls 14, but rather is angled to correspond to the angle of the skirt system 52.

Figure 6:
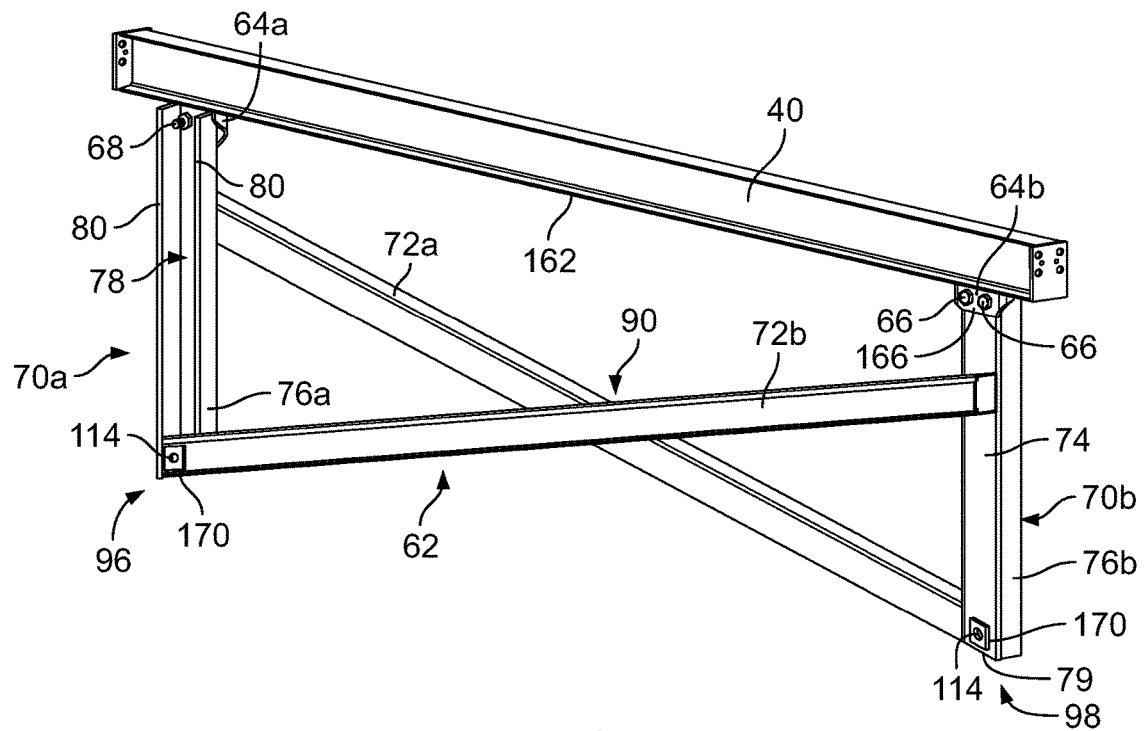
FIG. 6 is an isometric view of a first example cross-brace for use with the support system of FIGS. 3-5.
Figure 7:
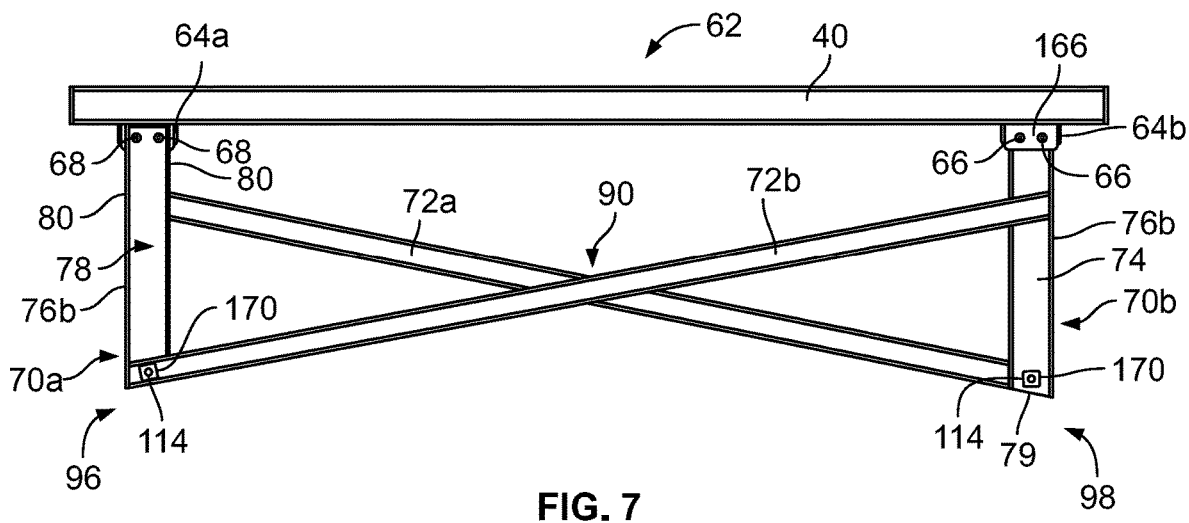
FIG. 7 is a front elevational view of the first example cross-brace of FIG. 6.

Illustratively, each first example cross-brace 62 may include one or more truss members or beams with various cross-sections that offer suitable column compression and buckling strength. As shown in FIGS. 6 and 7, the first example cross-brace 62 may include first and second vertical posts 70a, b at first and second ends 96, 98, and first and second truss beams 72a, b crisscrossed between the two vertical posts 70a, b. More specifically, the first truss beam 72a is coupled to an upper portion of the first vertical post 70a at the first end 96 and to a lower portion of the second vertical post 70b at the second end 98. Similarly the second truss beam 72b is coupled to a lower portion of the first vertical post 70a at the first end 96 and to an upper portion of the second vertical post 70b at the second end 98. As a result, the truss beams 72 are oriented diagonally opposite from each other to form an X-shape. Herein, "upper portion" may generally refer to any portion along an upper half of a respective vertical post 70a,b and "lower portion" may generally refer to any portion along a lower half of the vertical post 70a, b.

Figure 8:
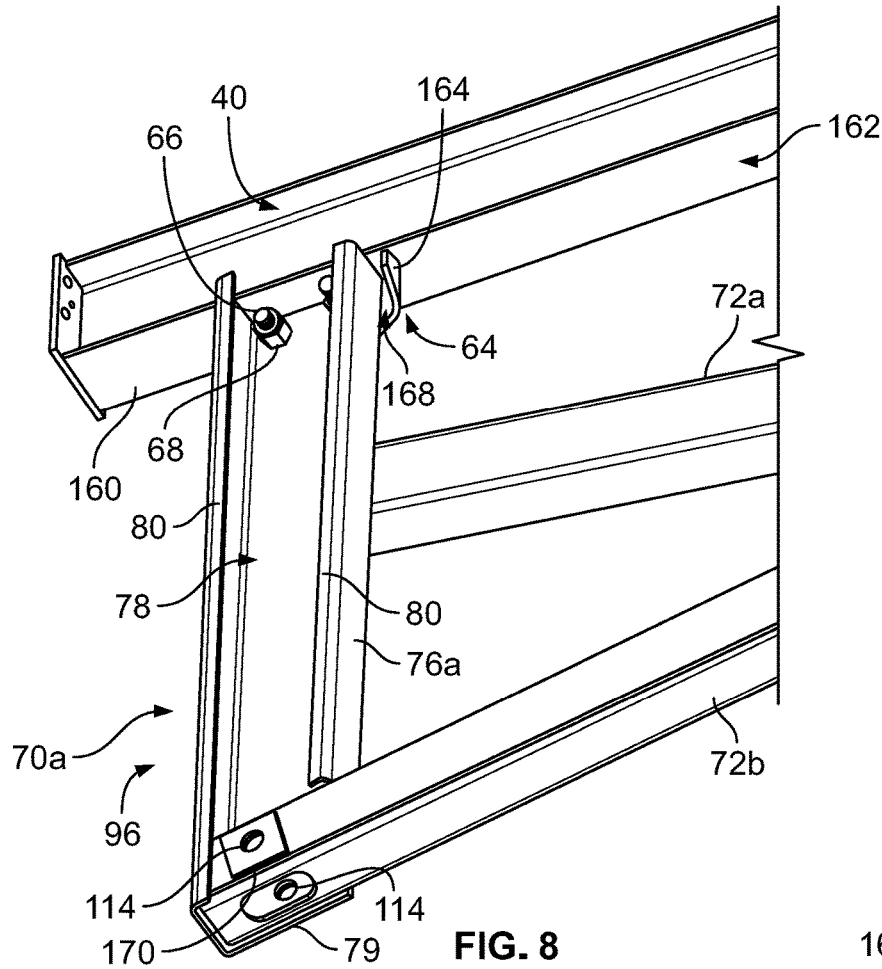
FIG. 8 is a partial isometric view of the first example cross-brace of FIGS. 6 and 7.

As shown in FIGS. 6-9, each of the first and second vertical posts 70a, b is provided in the form of a member having a generally C-shaped cross-sectional profile with a closed face 74, first and second closed sides 76a, b, and an open face 78. Each side face 76a, b may also include outer flanges 80. Furthermore, the first and second vertical posts 70a, b may be oriented opposite each other at the first and second ends 96, 98 of the cross-brace 62. More specifically, the first vertical post 70a includes an open face 78 that faces rearward (e.g., toward the rear wheel assembly 22), and the second vertical post 70b includes an open face 78 that faces forward (e.g., toward the landing gear 24). Illustratively, the first and second truss beams 72a, b are coupled to the open faces 78 at the respective lower portions of the first and second vertical posts 70a, b. Similarly, the first and second truss beams 72a, b are coupled to the respective closed faces 74 at the upper portion of the first and second vertical posts 70a, b. Additionally, as shown in FIG. 6, at the lower portion of each vertical post 70, the inwardly-facing first side faces 76a may be shorter than the outwardly-facing second side faces 76b to receive the diagonally oriented first and second truss beams 72a, b. Furthermore, bottom edges 79 of the closed faces 74 may be angled from the outwardly-facing second side faces 76b to the inwardly-facing first side faces 76a to align with the respective first and second truss beams 72a, b, as shown in FIGS. 6-8.

Figure 9:
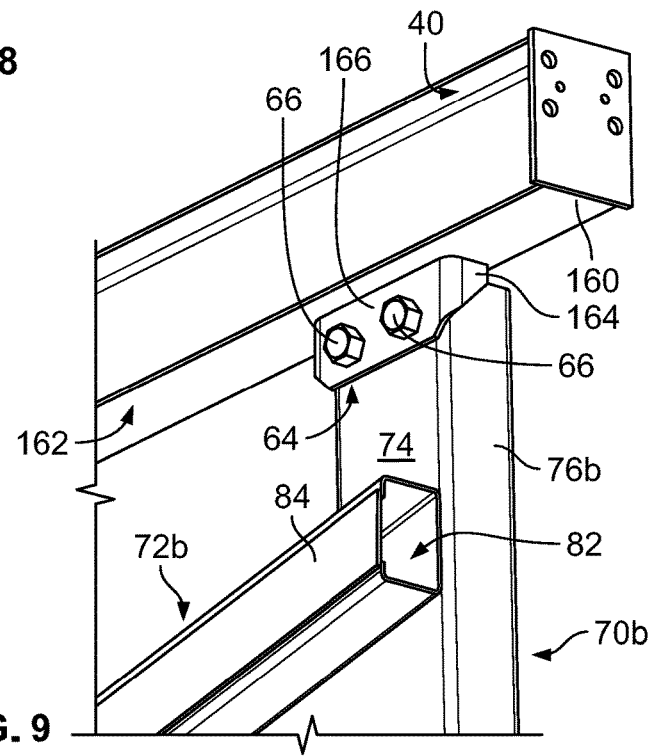
FIG. 9 is another partial isometric view of the first example cross-brace of FIGS. 6-8.

In some embodiments, as shown in FIGS. 6-9, the first and/or second truss beams 72a, b may be provided as a rectilinear enclosed beam provided in the form of a box. For example, as shown in FIG. 9, the first and/or second truss beams 72a, b are defined by a sidewall forming a C-shaped channel 82 with a plate 84 coupled over an open face of the C-shaped channel 82, thus creating a box-shaped channel with four solid faces. In some embodiments, the plate 84 may be stich welded to the C-shaped channel 82. Alternatively, in some embodiments, the box-shaped the first and/or second truss beams 72a, b may be formed as a one-piece extruded component.

The first and second truss beams 72a, b may be coupled to the lower and upper portions of the first and second vertical posts 70a, b, for example, via a welded coupling. However, other coupling mechanisms may be contemplated within the scope of this disclosure, such as bolts or fasteners. Furthermore, the first and second truss beams 72a, b may be loaded in compression, then welded together at an intersection point 90 to provide further structural integrity to the cross-brace 62. In other embodiments, however, the first and second truss beams 72a, b may be pinned, bolted, bonded, hinged, or otherwise coupled together at the intersection point 90.

Other configurations of truss beams in addition to those illustrated and described herein may be contemplated within the scope of this disclosure. Furthermore, the first example cross-braces 62 described herein may include material that is substantially rigid, but lightweight. For example, the first example cross-braces 62 may include any suitable material such as, but not limited to, metallic extrusions (such as extruded aluminum), roll formed high-strength aluminum alloy or high-strength steel, fiber reinforced polymeric matrix pultrusions, galvanized steel sheet stampings, combinations thereof, or any other suitable material or materials. Generally, such a suitable material may include suitable strength and light-weight features, and be conducive to form strong connections via welding, riveting, bolting, bonding or other methods. For example, the first example cross-braces 62 may also or alternatively include compression molded composite laminates and/or foam cores structures, such as compression-molded, fiberglass-reinforced plastic.

To couple the cross-braces 62 along a width of the trailer 10, each cross-brace 62 may be coupled directly to a respective cross member 40 of the floor assembly 26. For example, in some embodiments, a cross-brace 62 may be coupled to a cross member 40 using first and second brackets 64a, b, as shown in FIGS. 6-9. More specifically, in one embodiment, the first and second brackets 64a, b may be welded to the cross member 40 (e.g., adjacent each end 96, 98), and the cross-brace 62 may be bolted to the first and second brackets 64a, b via respective bolted connections with the first and second vertical postings, each of the bolted connections including a bolt 66 and nut 68 (or connected via another suitable coupling). It should be noted that, while first and second brackets 64a, b are shown in FIGS. 6-7, it is within scope of this disclosure to include additional brackets 64 or weld points along the cross member 40.

The welded connection between the brackets 64 and the cross member 40 may help distribute vertical and horizontal loads from the cross-braces 62 to the floor assembly 26. In some embodiments, each bracket 64 may be welded to a single surface of a respective cross member 40. More specifically, as shown in FIGS. 6-9, each bracket 64 may be welded to an underside or bottom surface 160 of a lower flange 162 of a respective cross member 40. This single undersurface connection can simplify installation, for example, compared to mechanisms that connect to multiple surfaces of the cross member 40 (e.g., above the lower flange 162) or that require bolting through the cross member 40, especially in retrofit applications. For example, welding can be performed from a top side of the bracket 64 to the underside 160 of the lower flange 162.

In some embodiments, welding can be performed as a sub-assembly process during manufacturing of the floor assembly 26. More specifically, a respective cross member 40 may be flipped over to weld the bracket 64 to the underside 160 of the lower flange 162, and then the cross member 40 may be flipped back and assembled into the floor assembly 26. Once the floor assembly 26 is assembled, vertical legs 70 can be coupled to the brackets 64, as further described below. Accordingly, the brace system 56 may be manufactured when the floor assembly 26 is being manufactured (e.g., as part of an OEM process). Alternatively, in some embodiments, the brace system 56 may be retrofitted onto an existing floor assembly 26. In either manner, welding the brackets 64 to the cross members 40 (and then coupling the vertical legs to the brackets 64) may be an easier process than directly welding or coupling the first and second vertical posts 70a, b to the cross members 40. However, direct couplings between the first and second vertical posts 70*a, b* and the cross members 40 may also be contemplated in some embodiments.

As shown in FIGS. 6-9, the bracket 64 can extend downwardly from the lower flange 162 and can be substantially C-shaped (e.g., having two solid sides 164, a closed face 166, and an open face 168). As shown in FIGS. 8-9, the bracket 64 can be sized to surround the closed face 74 and at least a portion of each side face 76 of a vertical post 70. Accordingly, first and second brackets 64*a, b* can be welded to the cross member 40 in a manner that matches an orientation of the respective first and second vertical posts 70*a, b*. More specifically, as shown in FIGS. 6 and 7, the first and second brackets 64*a, b* respectively at the first and second ends 96, 98, like the first and second vertical posts 70*a, b*, may be mirror images of one another. Thus, the first and second brackets 64*a, b* can be sized and positioned to receive a vertical post 70 so that the closed face 74 of the vertical post 70 extends into the open end 168 of the bracket 64 until it abuts the closed face 166 of the bracket 64. In other words, the first and second brackets 64*a, b* and the first and second vertical posts 70*a, b* are respectively offset from one another along the cross member 40. The first truss beam 72*a* is thus offset from the second truss beam 72*b* to engage the lower portion of the open face 78 of the first vertical post 70*a*, to engage the second truss beam 72*b* at the intersection point 90, and to engage the upper portion of the closed face 74 of the second vertical post 70*b*. Further, the second truss beam 72*b* is thus offset from the first truss beam 72*a* to engage the lower portion of the open face 78 of the second vertical post 70*b*, to engage the first truss beam 72*a* at the intersection point 90, and to engage the upper portion of the closed face 74 of the first vertical post 70*a*.

Illustratively, the first and second vertical posts 70*a, b* can be respectively coupled to the first and second brackets 64*a, b* by engaging the closed face 74 with the open face 168. For example, the first and second brackets 64*a, b* and the first and second vertical posts 70*a, b* can each define mating apertures that align when the first and second vertical posts 70*a, b* are respectively received by the first and second brackets 64*a, b*. Illustratively, the first and second brackets 64*a, b* and the first and second vertical posts 70*a, b* can be respectively coupled together via bolts 66 routed through the mating apertures and nuts 68 securing the bolts 66 in place. This single sheer connection (i.e., the single vertical-surface contact point) between the first and second brackets 64*a, b* and the first and second vertical posts 70*a, b* makes aligning the mating apertures easier (e.g., as compared to couplings with multiple sheer connections) and also permits use of the bolt 66 to force components with variation into a correct position, thus permitting larger tolerances for aligning mating apertures and simplifying installation.

In some embodiments, each cross-brace 62 may be coupled to a respective cross member 40 through other coupling methods, such as welding, bolting, fasteners, and/or other suitable couplings. Alternatively, in some embodiments, one or more cross members 40 may be replaced with an integrated member that serves as both a cross member and a cross-brace. Furthermore, while the floor assemblies 26 are described and illustrated herein as including cross members 40, it is within the scope of this disclosure to couple the cross-braces 62 to floor assemblies 26 of trailers without cross members 40. In other words, while the cross-braces 62 are described and illustrated herein as being coupled to or integral with cross members 40, it is within the scope of this disclosure to couple the cross-braces 62 to any part of the floor assembly 26 using, for example, fasteners, adhesives, or other suitable coupling methods.

Additionally, in some embodiments, one or more cross-braces 62 may be further coupled to the skirt walls 60. For example, the cross-braces 62 and the skirt walls 60 may be coupled together via self-tapping bolts, rivets, or another suitable connector (not shown). The skirt walls 60 may thus be coupled to the support system 54 (such as the vertical posts 70), and/or to the floor assembly 26, and/or may be spaced apart from the support system 54 in some embodiments.

Accordingly, the cross-braces 62, via the first and second truss beams 72*a, b*, may provide sufficient strength and support between the skirt walls 60 to help reduce the chances of vehicle underride during a side impact collision. Furthermore, due to the interlocking first and second truss beams 72*a, b*, the cross-braces 62 may operate to absorb some of the force and energy of any impact thereto to potentially decrease any forces on the passengers within an automobile that impacts the trailer 10. The cross-braces 62 may also compress, deflect, or collapse slightly under impact (i.e., under lateral forces) to further absorb such forces.

Referring now to the cable system 58, as best seen in FIGS. 3-5, the cable system 58 may include one or more cables 112 that traverse the intervals between adjacent cross-braces 62. In one example, the cable 112 may be routed through the cross-braces 62 in tension to form the support system 54 having connected cross-braces 62 across a length of the trailer 10. In another example, the cable 112 may be coupled to adjacent cross-braces 62 across a length of the trailer 10 in tension to form the support system 54 having connected cross-braces 62. Illustratively, the cable 112 may be routed through or coupled to the cross-braces 62 near the lower portion of each vertical post 70. As a result, the cable 112 may further assist to limit movement of the cross-braces 62 and maintain the vertical posts 70 in a substantially vertical orientation with respect to the floor assembly 26. However, in other embodiments, the cable 112 may be routed or coupled at any location along the height of the vertical posts 70.

According to the first example, in some embodiments, as shown in FIGS. 6-8, the first and second vertical posts 70*a, b* of the cross-braces 62 may include an aperture(s) or a channel 114, and the cable 112 may be routed through the apertures 114 in tension to form the support system 54 of connected cross-braces 62. Illustratively, the apertures 114 may be positioned near the lower portion of the first and second vertical posts 70*a, b*. As a result, the apertures 114 may also extend through the first and second truss beams 72*a, b* positioned at the lower portion of the vertical post 70. Furthermore, one or more washers 170 may be positioned on the first and second vertical posts 70*a, b* and/or the first and second truss beams 72*a, b* adjacent each aperture 114. Additionally, in some embodiments, collars (not shown) may be added on either side of each vertical post 70 to limit lateral sliding movement of the cable 112 relative to the first and second vertical posts 70*a, b*. In this manner, if one or more of the first and second vertical posts 70*a, b* fails upon an impact, the collar may help transfer load to adjacent vertical posts 70 rather than allowing the cable 112 to be pulled inwardly by the force of the impact.

Referring to FIGS. 10-13, a first example cable support subassembly 200*a* includes a first example cable clamp 180 connected to a second example cross-brace 262 in a first orientation 210. Similarly, referring to FIGS. 14-17 a second example support subassembly 200*b* includes the first example cable clamp 180 connected to the second example cross-brace 262 in a second orientation 220.

Figure 10:
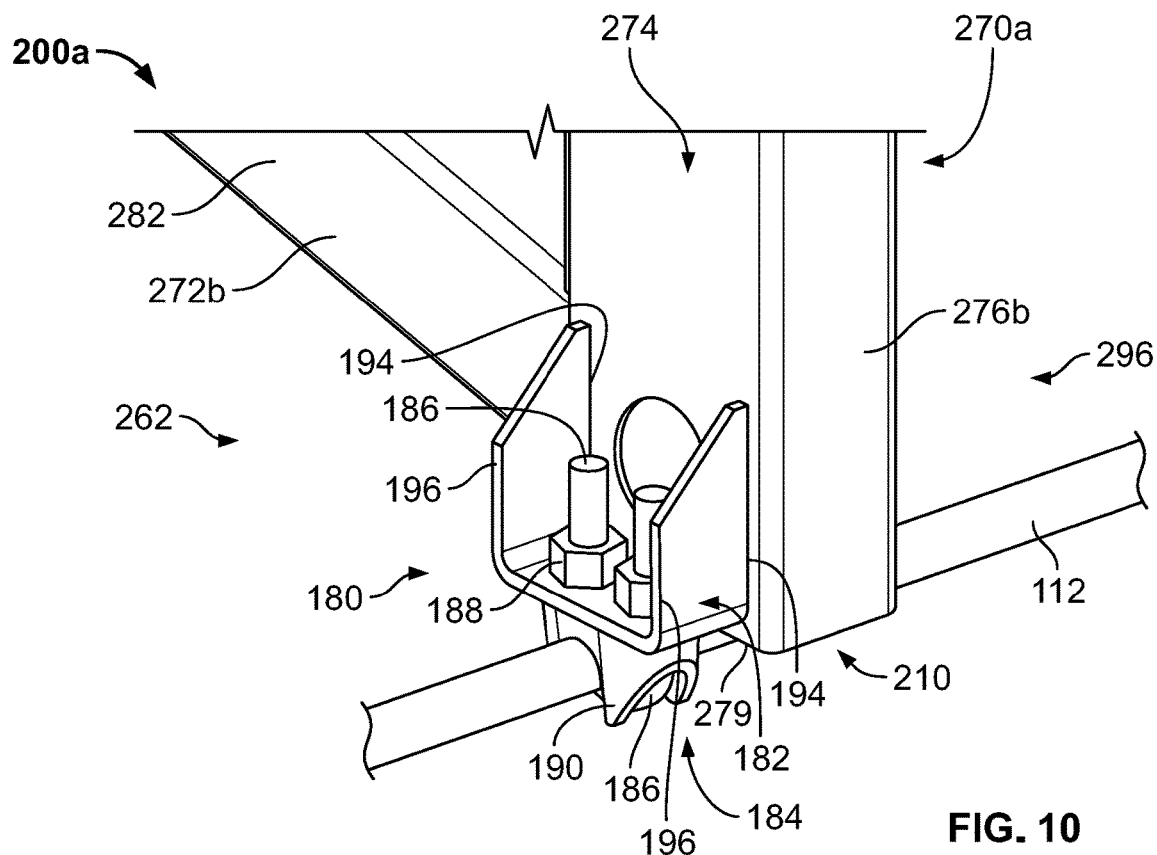
FIG. 10 is a partial isometric view of a first example cable clamp and a second example cross-brace assembled in a first orientation for use with the cable system of the side underride system of FIGS. 1-5.
Figure 11:
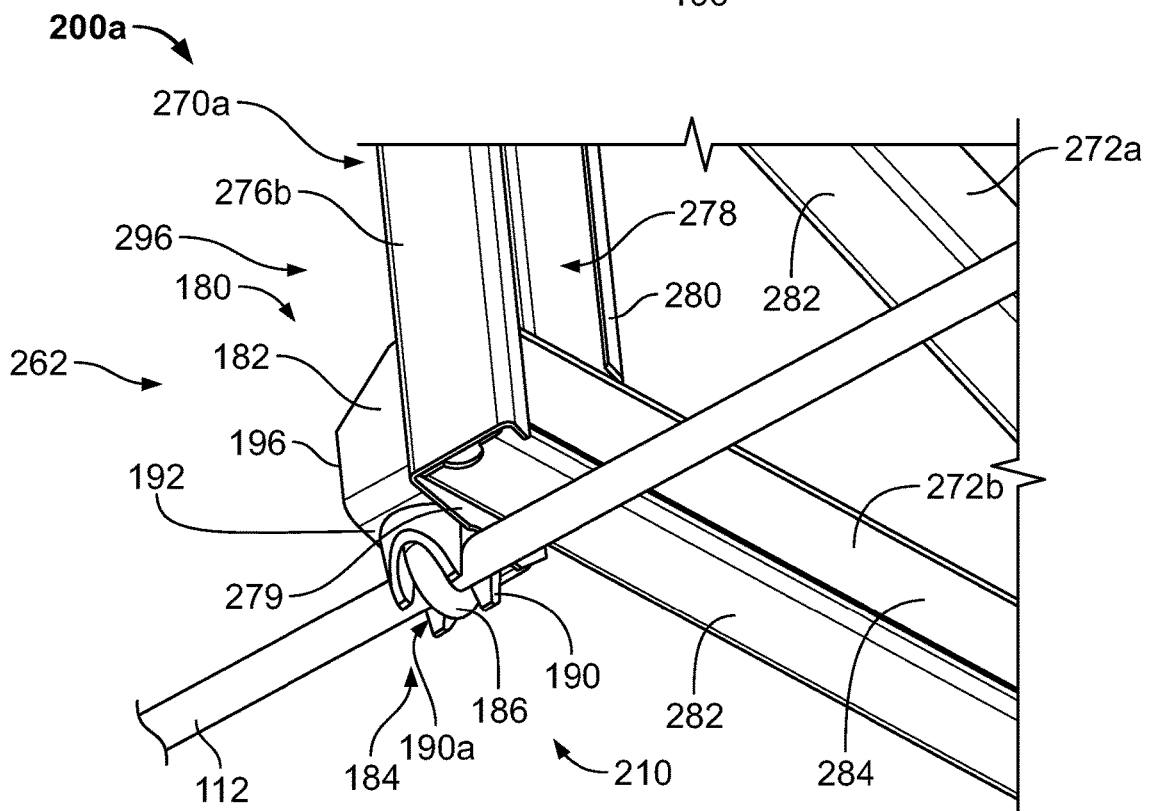
FIG. 11 is another partial isometric view of the first example cable clamp and the second example cross-brace of FIG. 10 assembled in the first orientation of FIG. 10.

Referring particularly now to FIG. 11, a second example cross-brace 262 includes a first vertical post 270a, a second vertical post (not shown), and first and second truss beams 272a, b. Referring to FIGS. 10-17, it should be understood that the second example cross-brace 262 is a variation on, and thus structurally similar to, the first example cross brace 62 of FIGS. 6-9. It should also be understood that the second example cross-brace 262 is designed to connect to the cross member 40 in the same manner as the first example cross-brace 62 of FIGS. 6-9.

Referring still to FIGS. 10-17, like the first example cross-brace 62 of FIGS. 6-9, the first and second truss beams 272a, b of the second example cross-brace 262 diagonally cross one another and are connected to the first vertical post 270a and to the second vertical post. The first vertical post 270a is generally C-shaped, having a closed face 274, first and second closed sides 276a, b, and an open face 278. Each side face 276a, b may also include outer flanges 280. Like the first and second vertical posts 70a, b of FIGS. 6-9, the first vertical post 270a and the second vertical post are arranged opposite one another at a first end 296 and a second end (not shown) of the cross-brace 262. The second vertical post is generally identical to the first vertical post 270a. Thus, the first vertical post 270a and the second vertical post are mirror images of one another.

Figure 12:
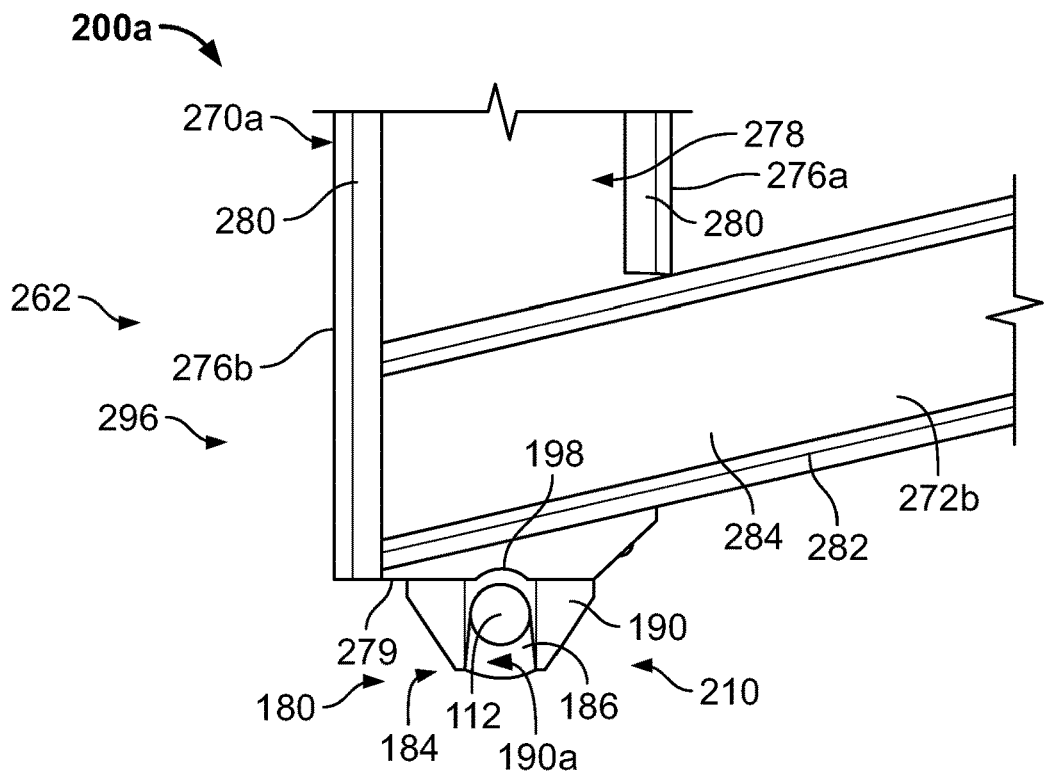
FIG. 12 is a partial front elevational view of the first example cable clamp and the second example cross-brace of FIGS. 10 and 11 assembled in the first orientation of FIGS. 10 and 11.
Figure 13:
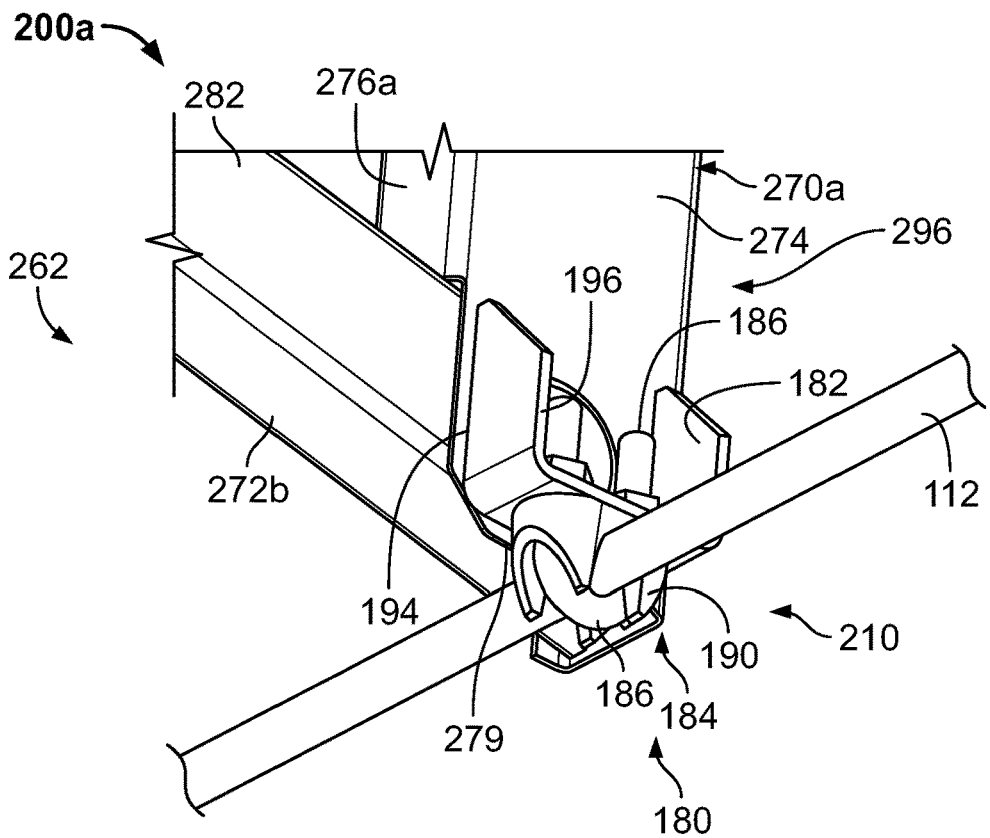
FIG. 13 is another partial isometric view of the first example cable clamp and the second example cross-brace of FIGS. 10-12 assembled in the first orientation of FIGS. 10-12.
Figure 14:
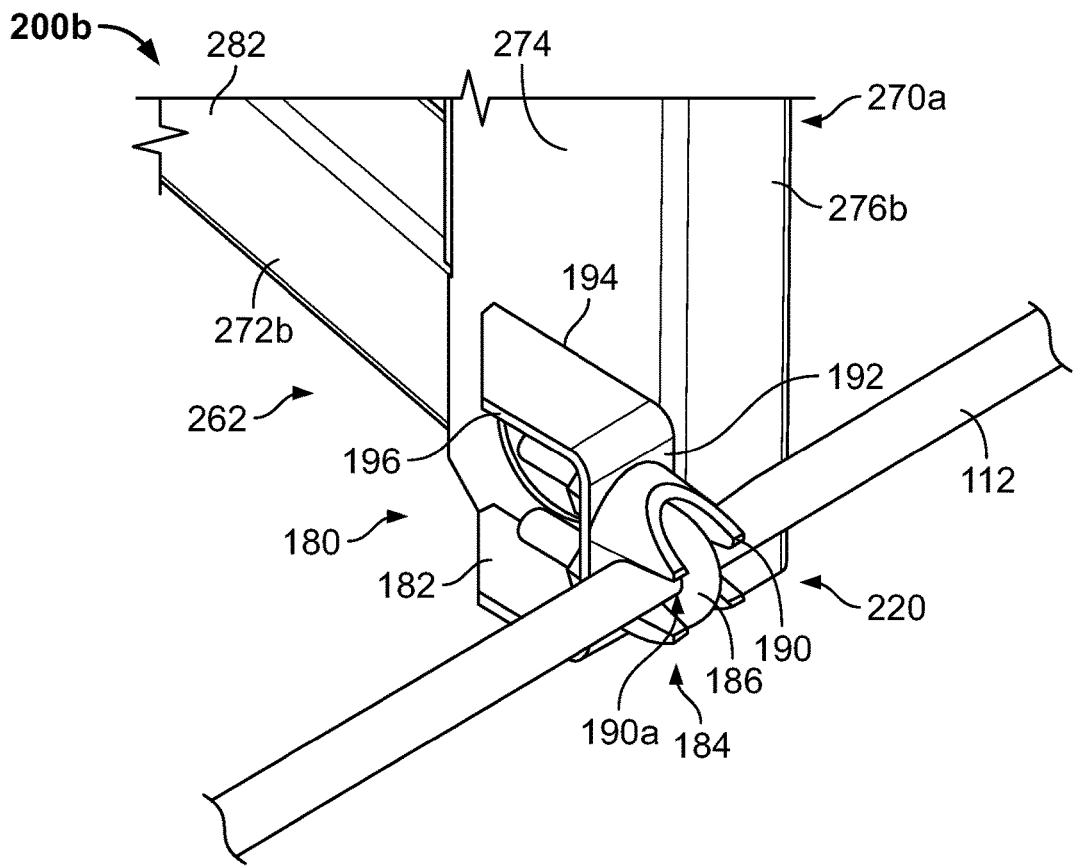
FIG. 14 is a partial isometric view of the first example cable clamp and the second example cross-brace of FIGS. 10-13 assembled in a second orientation for use with the cable system of the side underride system of FIGS. 1-5.
Figure 15:
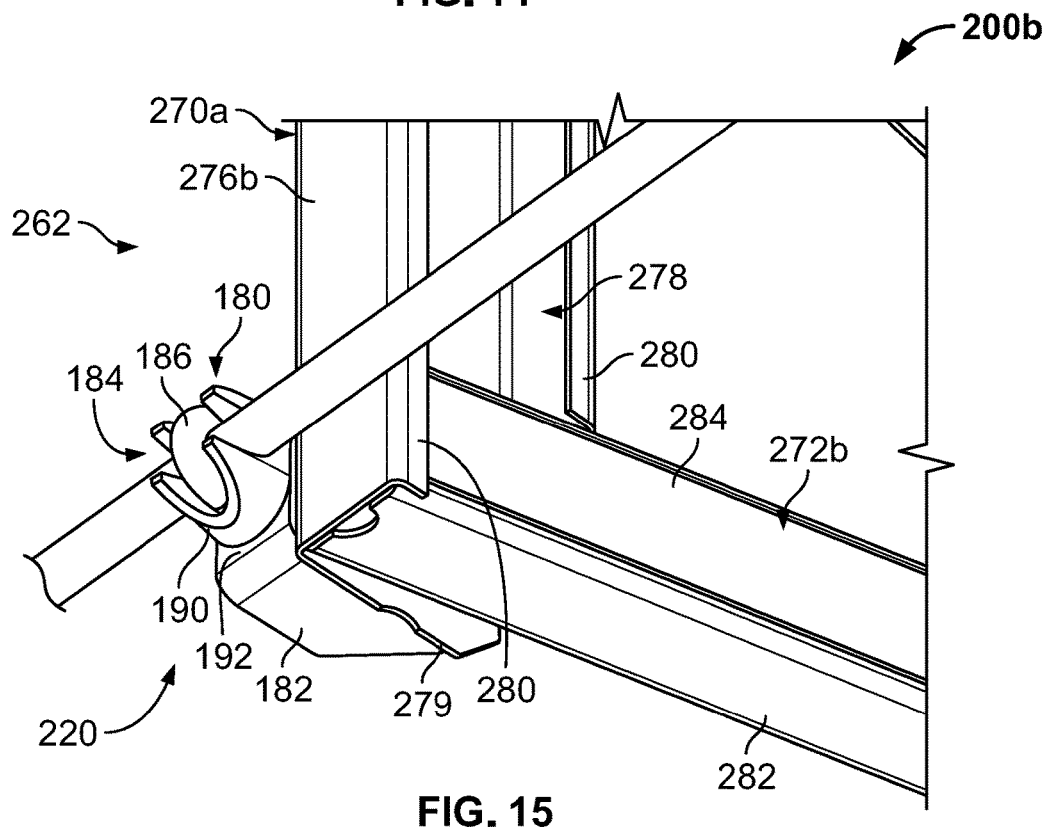
FIG. 15 is another partial isometric view of the first example cable clamp and the second example cross-brace of FIGS. 10-14 assembled in the second orientation of FIG. 14.
Figure 16:
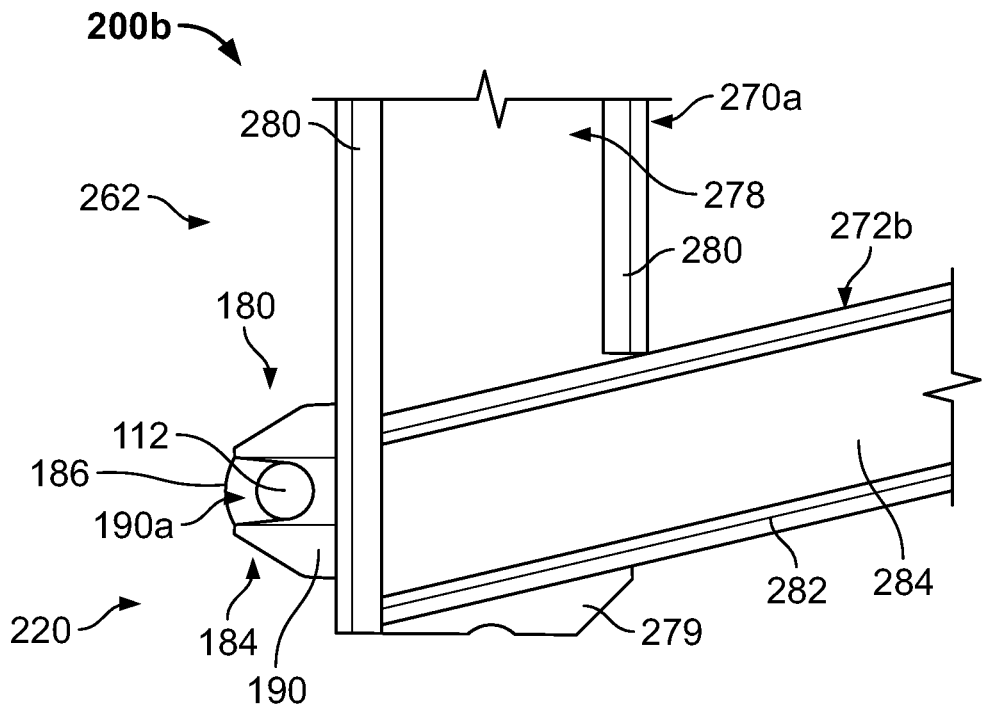
FIG. 16 is a partial front view of the first example cable clamp and the second example cross-brace of FIGS. 10-15 assembled in the second orientation of FIGS. 14-15.

Referring again to FIGS. 10-17, the first and second truss beams 272a, b are coupled to the first vertical post 270a and the second vertical post in the same manner as the first and second truss beams 72a, b of FIGS. 6-9 are coupled to the first and second vertical posts 70a, b of FIGS. 6-9. Additionally, as shown in FIG. 12, at the lower portion of the first vertical post 270a, the inwardly-facing first side face 276a is shorter than the outwardly-facing second side face 276b to receive the diagonal second truss beam 272b. The second vertical post similarly receives the diagonal first truss beam 272a (see FIG. 6). In contrast with the first example cross-brace 62 of FIGS. 6-9, the first vertical post 270a includes a lobe 279 that extends downwardly beyond the second truss beam 272b, as shown in FIGS. 11-13. Similarly, the second vertical post also includes a lobe that extends downwardly beyond the first truss beam 272a (not shown).

Like in the first example cross-brace of FIGS. 6-9, in some embodiments, as shown in FIGS. 10-17, the first and/or second truss beams 272a, b may be box-shaped. For example, as shown in FIGS. 11, 12, 15, and 16 the first and/or second truss beams 272a, b may include a C-shaped channel 282 with a plate 284 coupled over an open face of the C-shaped channel 282, thus creating a box-shaped channel with four solid faces. In some embodiments, the plate 284 may be stich welded to the C-shaped channel 282. Alternatively, in some embodiments, the box-shaped the first and/or second truss beams 272a, b may be formed as a one-piece extruded component.

Referring to FIGS. 10-17, the first and second truss beams 272a, b may be coupled to the lower and upper portions of the first vertical post 270a and the second vertical post, for example, via a welded coupling. However, other coupling mechanisms may be contemplated within the scope of this disclosure, such as bolts or fasteners. Furthermore, the first and second truss beams 272a, b may be loaded in compression, then welded together to provide further structural integrity to the second example cross-brace 262. In other embodiments, however, the first and second truss beams 272a, b may be pinned, bolted, bonded, hinged, or otherwise coupled together.

Still referring to FIGS. 10-17, it should be understood that the first vertical post 270a, the second vertical post, and the first and second truss beams 272a, b do not define apertures through which the cable 112 is routed, in contrast with the first example cross brace 62 of FIGS. 6-9 that defines the cable-routing apertures 114. Instead, according to a second example, in some embodiments, as shown in FIGS. 10-17, the cable 112 may be coupled to the cross-braces 262 via a first example cable clamp 180 to form the support system 54 of connected second example cross-braces 262. Illustratively, the first example cable clamps 180 may be coupled to the first vertical post 270a and to the second vertical post, and the cable 112 may be routed through the cable clamps 180 to couple the cable 112 to the cross-brace 262. In the example of FIGS. 10-13, the first example cable clamps 180 are be coupled to the first vertical post 270a and to the second vertical post in a first orientation 210 to extend downwardly from the cross brace 262. In the example of FIGS. 14-17, the first example cable clamps 180 are be coupled to the first vertical post 270a and to the second vertical post in a second orientation 220 to extend outwardly from the cross brace 262. Alternatively, the cable clamps 180 may be coupled to the first and second truss beams 272a, b to couple the cable 112 to the cross-brace 262.

Figure 17:
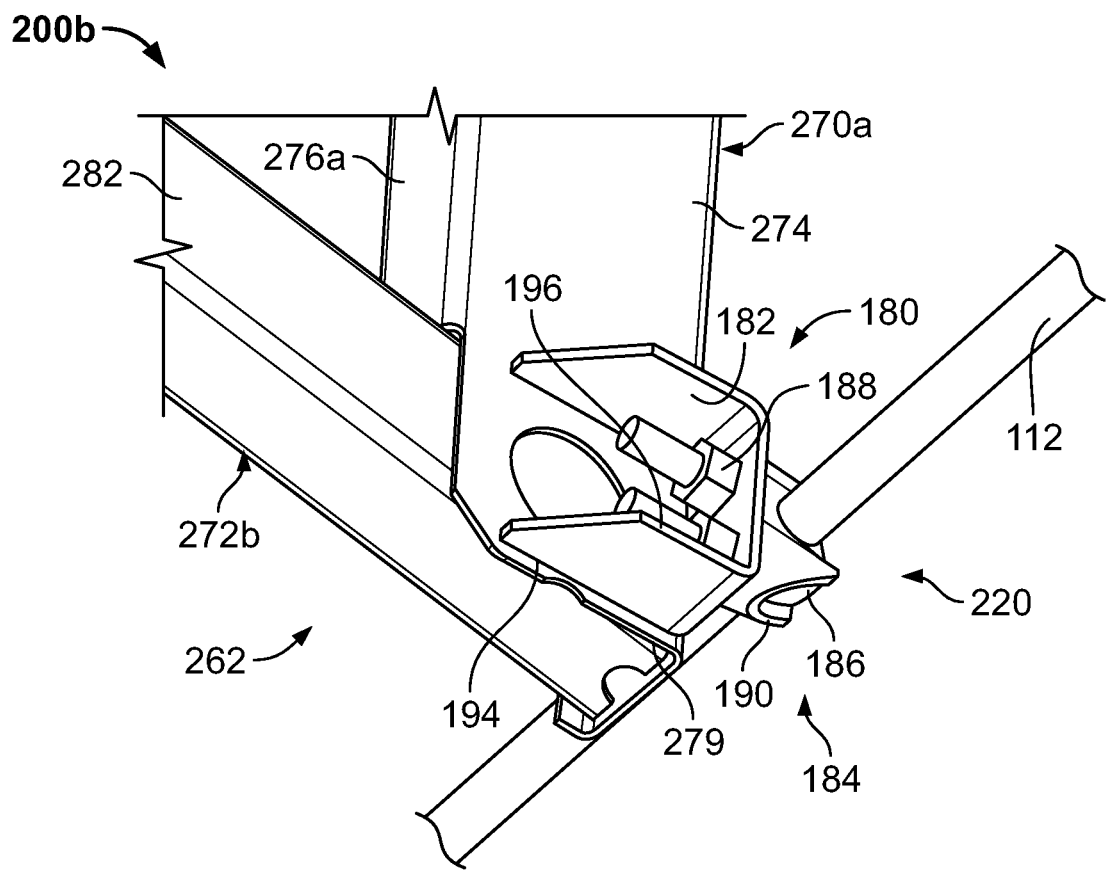
FIG. 17 is another partial isometric view of the first example cable clamp and the second example cross-brace of FIGS. 10-16 assembled in the second orientation of FIGS. 14-16.
Figure 18:
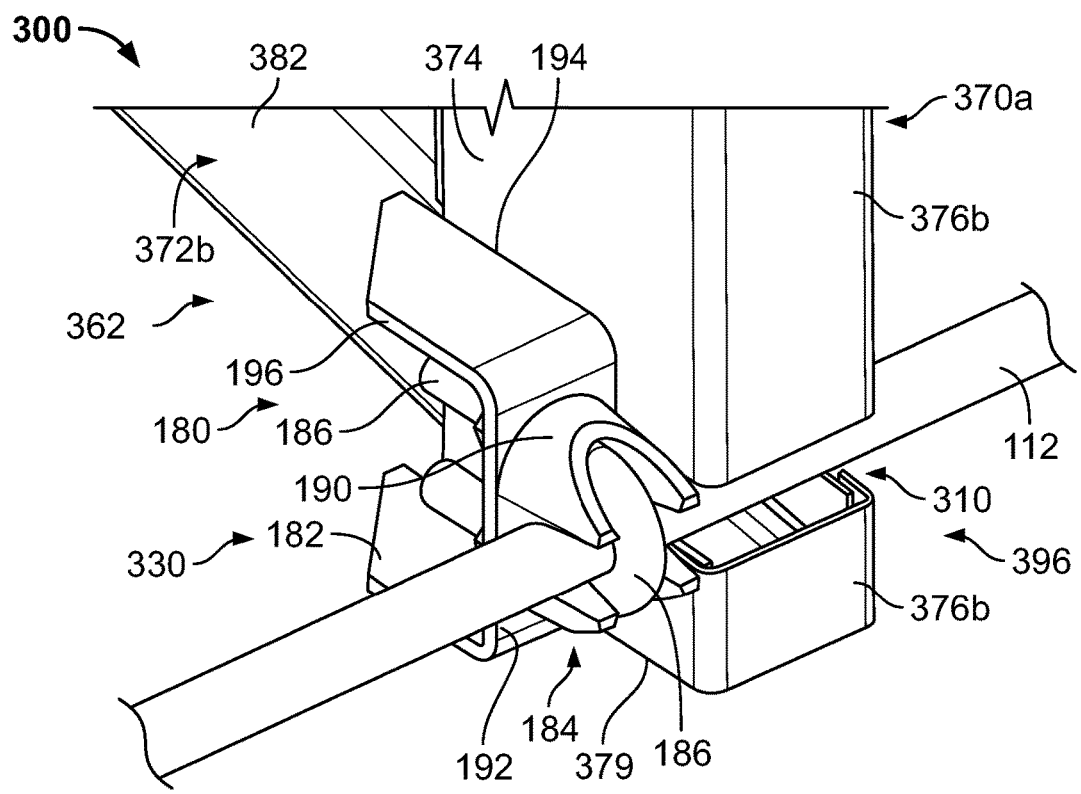
FIG. 18 is a partial isometric view of the first example cable clamp of FIGS. 10-17 assembled to a third example cross-brace for use with the cable system of the side underride system of FIGS. 1-5.
Figure 19:
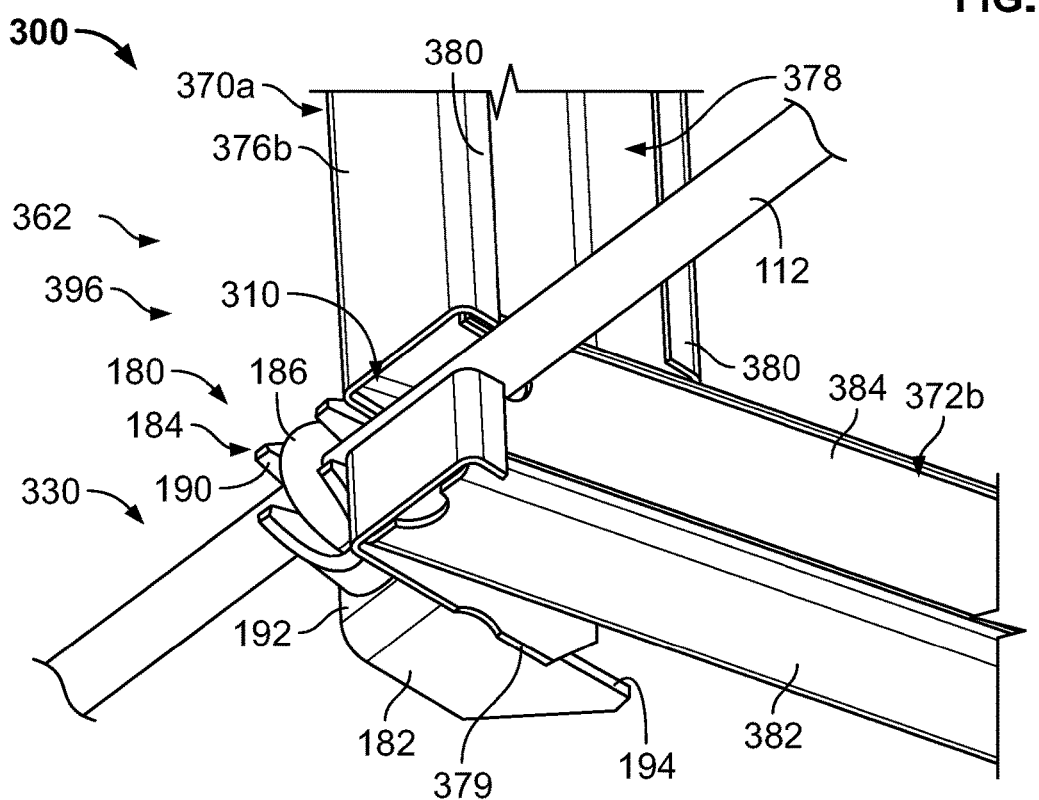
FIG. 19 is another partial isometric view of the first example the cable clamp of FIGS. 10-18 assembled to the third example cross-brace of FIG. 18.
Figure 20:
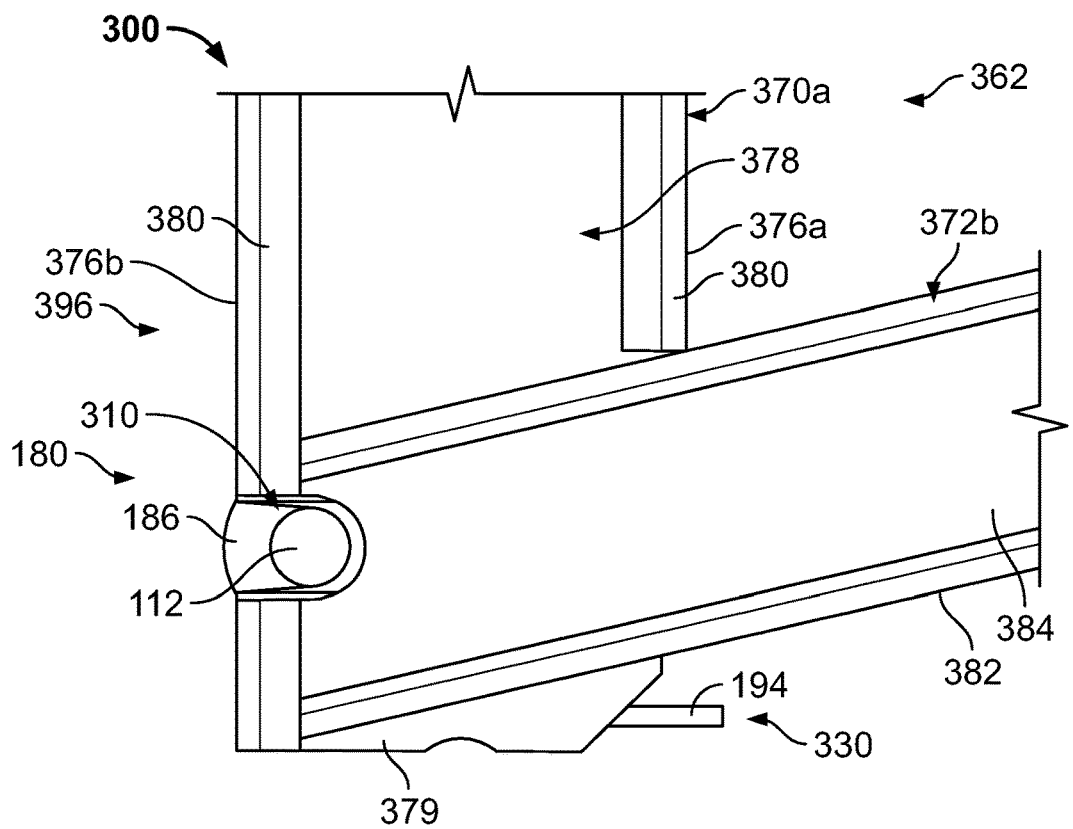
FIG. 20 is a partial front view of the first example cable clamp of FIGS. 10-19 assembled to the third example cross-brace of FIGS. 18-19.
Figure 21:
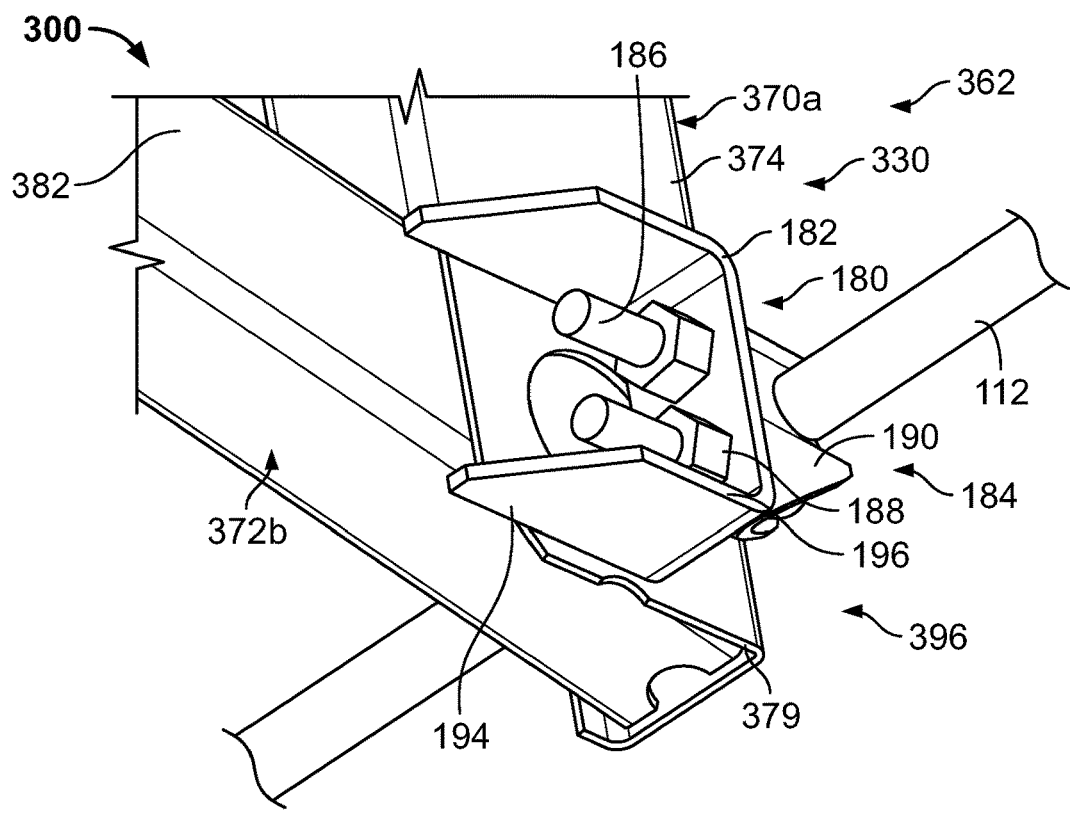
FIG. 21 is another partial isometric view of the cable clamp of FIGS. 10-20 assembled to the third example cross-brace of FIGS. 18-20.
Figure 22:
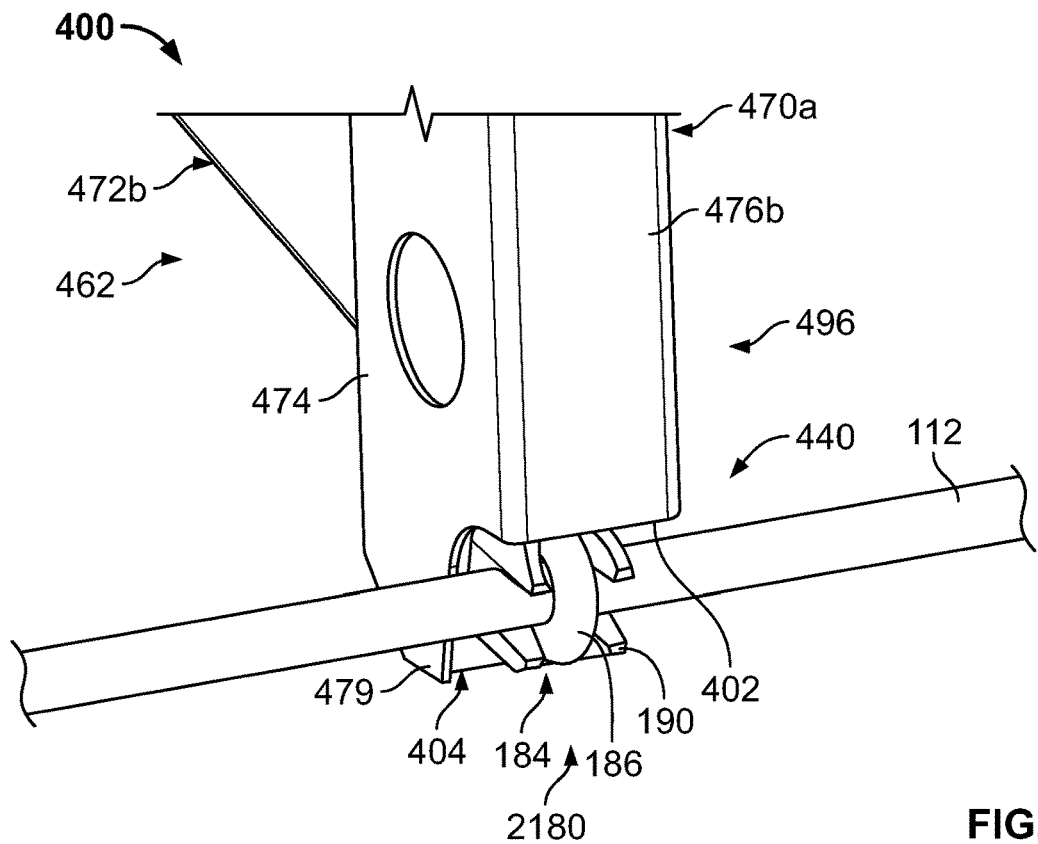
FIG. 22 is a partial isometric view of a second example cable clamp assembled to a fourth example cross-brace for use with the cable system of the side underride system of FIGS. 1-5.

Referring to FIGS. 10-21, each first example cable clamp 180 may include a bracket 182 and a rope clip 184 including a U-bolt 186, nuts 188, and a saddle 190. Referring more specifically to FIGS. 11, 12, 14, and 16, the saddle 190 defines an aperture 190a (e.g., a trough). The cable 112 may be secured between the U-bolt 186 and the saddle 190 by routing the U-bolt 186 through the aperture 190a of the saddle 190. With reference to FIGS. 10, 17, and 21, the cable 112 may thus be coupled to the bracket 182 via the U-bolt 186 and the nuts 188. More specifically, the bracket 182 may define apertures (not shown), the U-bolt 186 may be routed through the apertures from one side of the bracket 182, and the nuts 188 may be threaded or otherwise secured to the U-bolt 186 from the other side of the bracket 182. As shown in FIGS. 10, 11, 13-15, 17-19, and 21, the saddle 190 is engaged with the bracket 182. In some embodiments, the saddle 190 may be welded or otherwise coupled to a surface 192 of the bracket 182. In other embodiments, the saddle 190 may be separate from the bracket 182, and the nuts 188 may be tightened against the U-bolt 186 until the saddle 190 abuts the surface 192 of the bracket 182. In some embodiments, the saddle 190 may be omitted. In such embodiments, the cable 112 may be captured between the U-bolt 186 and the surface 192.

It should be understood that as the nuts 188 are tightened, the U-bolt 186 draws the cable 112 toward the surface 192 until the cable 112 contacts the saddle 190 and/or the surface 192. Thus, in some embodiments, the cable 112 may be relatively freely slidably engaged with the rope clip 184. Once the cable 112 is in contact with the saddle 190 and/or the surface 192, further tightening of the nuts 188 increasingly compresses the cable 112 between the U-bolt 186 and the surface 192. Thus, in some embodiments, the cable 112 may be restrictively slidably engaged with the rope clip 184. In further embodiments, the nuts 188 may be tightened until the cable 112 is fixed relative to the rope 184. In other words, the rope clip 184 is adjustable to frictionally damp lateral sliding movement of the cable 112 relative to the rope clip 184. Thus, the rope clip 184 adjustably impedes sliding movement of the cable 112 relative to the structures to which the rope clip 184 is directly and indirectly attached (e.g., the cross brace 262, the bracket 182, etc.).

An assembled cable clamp 180 (that is, the U-bolt 186, the saddle 190, the cable 112, and the bracket 182, assembled together via the nuts 188) may be coupled to the cross-brace 262 via the bracket 182. More specifically, the bracket 182 may be welded or otherwise coupled to one or more of the first vertical post 270a, the second vertical post, the first truss beam 272a, and/or the second truss beam 272b. Illustratively, the bracket 182 may be substantially C-shaped, as shown in FIGS. 10-21, with a longer side edge 194 and a shorter side edge 196, and the longer side edge 194 may be welded to the vertical post 70 or the truss beam 72. The C-shaped orientation and longer side edge 194 may provide sufficient surface area for a strong weld connection while still permitting access to the nuts 188 when the bracket 182 is coupled to the cross-brace 62. It should also be noted that, in some embodiments, the C-shaped orientation of FIG. 10-21 may instead be L-shaped.

Looking at FIGS. 10-13, more specifically, the cable clamp 180 in the cable clamp bottom first orientation 210 of FIGS. 10-13 may be coupled to a closed face 274 of the first vertical post 270a (e.g., opposite the second truss beam 272b). An additional cable clamp 180 may be coupled to a closed end of the second vertical post (e.g., opposite the first truss beam 272a) (not shown). The cable clamp 180 may be coupled to respective lower portions of the first vertical post 270a and the second vertical post so that the surface 192 of the bracket 182 faces downward and the U-bolt 186 and the saddle 190 extend downward beneath the first vertical post 270a (e.g., beneath the lobe 279) and the second vertical post. As a result, the cable 112 may be routed underneath the first vertical post 270a and the second vertical post, as shown in FIGS. 10-13. In some embodiments, as shown in FIG. 12, the lobe 279 of the first vertical post 270a may include a carve-out 198 sized to accommodate the cable 112. However, in other embodiments, the lobe 279 may not include a carve-out. Because the cable 112 is routed beneath the first vertical post 270a and the second vertical post, and the cable clamp 180 does not extend laterally outside the first vertical post 270a and the second vertical post (e.g., past a plane extending from the trailer sidewall 14), the cable system 58 of this embodiment may not interfere with a skirt wall 60 that would extend downward from the sidewall 14. Accordingly, in this embodiment, a skirt system 52 may be installed before or after the support system 54 is installed. An additional first example cable clamp may be coupled to the second vertical post in the same manner as the illustrated first example cable clamp 180 is connected to the first vertical post 270a in the first orientation 210.

As shown in FIGS. 14-17, more specifically, the cable clamp 180 of the cable clamp outboard second orientation 220 of FIGS. 14-17 may be coupled to the closed face 274 of the first vertical post 270a (e.g., opposite the second truss beam 272b). An additional cable clamp 180 may be coupled to a closed end of the second vertical post (e.g., opposite the first truss beam 272a) (not shown). The cable clamp 180 may be coupled to respective lower portions of the first vertical post 270a and the second vertical post so that the surface 192 of the bracket 182 faces outwardly and the U-bolt 186 and the saddle 190 extend outside the first vertical post 270a and the second vertical post (e.g., outward past the respective outer side faces 276b of the first vertical post 270a and the second vertical post). As a result, the cable 112 may be routed outside the first vertical post 270a and the second vertical post, as shown in FIGS. 14-17. An additional first example cable clamp may be coupled to the second vertical post in the same manner as the illustrated first example cable clamp 180 is connected to the first vertical post 270a in the second orientation 220.

Referring now to FIGS. 18-21, a third example cable support subassembly 300 includes the first example cable clamp 180 connected to a third example cross-brace 362. The third example cross-brace 362 includes a first vertical post 370a, a second vertical post (not shown), a first truss beam (not shown), and a second truss beam 372b. It should be understood that the third example cross-brace 362 is a variation on, and thus structurally similar to, the first and second example cross braces 62, 262 of FIGS. 6-17. It should also be understood that the third example cross-brace 362 connects to the cross member 40 in the same manner as the first example cross-brace 62 of FIGS. 6-9.

Referring still to FIGS. 18-21, like the first and second example cross braces 62, 262 of FIGS. 6-17, the first truss beam and the second truss beams 372b of the third example cross-brace 362 diagonally cross one another and are connected to the first vertical post 370a and to the second vertical post. The first vertical post 370a is generally C-shaped, having a closed face 374, first and second closed sides 376a, b, and an open face 378. Each side face 376a, b may also include outer flanges 380. Like the first and second vertical posts 70a, b of FIGS. 6-9, the first vertical post 370a and the second vertical post are arranged opposite one another at a first end 396 and a second end (not shown) of the cross-brace 362. The second vertical post is generally identical to the first vertical post 370a. Thus, the first vertical post 370a and the second vertical post are mirror images of one another.

As shown in FIGS. 18-21, the first truss beam and the second truss beam 372 b are coupled to the first vertical post 370a and the second vertical post in the same manner as the first and second truss beams 72a, b of FIGS. 6-9 are coupled to the first and second vertical posts 70a, b of FIGS. 6-9. The first truss beam is generally identical to the second truss beam 372b. Thus, the first truss beam and the second truss beam 372b are mirror images of one another. Additionally, as shown in FIG. 20, at the lower portion of the first vertical post 370a, the inwardly-facing first side face 376a is shorter than the outwardly-facing second side face 376b to receive the diagonal second truss beam 372b. The second vertical post similarly receives the diagonal first truss beam (see FIG. 6).

Referring to FIGS. 18-21, in contrast with the first example cross-brace 62 of FIGS. 6-9, the first vertical post 370a includes a lobe 379 that extends downwardly beyond the second truss beam 372b, as shown in FIGS. 19-21. Similarly, the second vertical post also includes a lobe that extends downwardly beyond the first truss beam (not shown). Additionally in contrast with the first and second example cross-braces 62, 262 of FIGS. 6-17, a cutout is provided in the respective lower portions of the first vertical post 370a and the second vertical post that defines a recess 310 sized to receive the cable 112. More specifically, the recess 310 can be cut through the outer side face 376b, a portion of the closed face 374, and, in some embodiments, the respective first truss beam or second truss beam 372b.

Like in the first and second example cross-braces 62, 262 of FIGS. 6-17, in some embodiments, as shown in FIGS. 18-21, the first truss beam and/or second truss beam 372b may be box-shaped. For example, as shown in FIGS. 19 and 20 the second truss beam 372b may include a C-shaped channel 382 with a plate 384 coupled over an open face of the C-shaped channel 382, thus creating a box-shaped channel with four solid faces. In some embodiments, the plate 384 may be stich welded to the C-shaped channel 382. The first truss beam may be formed of a C-shaped panel and a plate in the same manner as the second truss beam 372b. Alternatively, in some embodiments, the box-shaped the first truss beam and/or the second truss beam 372b may be formed as a one-piece extruded component.

Referring to FIGS. 18-21, the first truss beam and the second truss beam 372b may be coupled to the lower and upper portions of the first vertical post 370a and the second vertical post, for example, via a welded coupling. However, other coupling mechanisms may be contemplated within the scope of this disclosure, such as bolts or fasteners. Furthermore, the first truss beam and the second truss beam 372b may be loaded in compression, then welded together to provide further structural integrity to the third example cross-brace 362. In other embodiments, however, the first truss beam and the second truss beam 372b may be pinned, bolted, bonded, hinged, or otherwise coupled together.

Looking still at FIGS. 18-21, it should be understood that, like the second example cross-brace 262 of FIGS. 10-17, the first vertical post 370a, the second vertical post, the first truss beam, and the second truss beams 372b do not define apertures through which the cable 112 is routed, in contrast with the first example cross brace 62 of FIGS. 6-9 that defines the cable-routing apertures 114. Instead, similar to the example of FIGS. 10-17, in some embodiments, as shown in FIGS. 18-21, the cable 112 may be coupled to the cross-braces 362 via the first example cable clamps 180 to form the support system 54 of connected third example cross-braces 362. Illustratively, the first example cable clamps 180 may be coupled to the first vertical post 370a and to the second vertical post in a third orientation 330 inboard of the recess 310. Further, the cable 112 may be routed through the cable clamps 180 and the recess 310 to couple the cable 112 to the cross-brace 362.

Looking at FIGS. 18-21, more specifically, in the third orientation 330, the cable clamp 180 may be coupled to the closed face 374 of the first vertical post 370a (e.g., opposite the second truss beam 372b). The cable clamp 180 may be coupled to a lower portion of the first vertical post 370a so that the surface 192 of the bracket 182 faces outward, like the second orientation 220 of FIGS. 14-17, but the coupling may be recessed inward so that the U-bolt 186 and the saddle 190 do not extend (or minimally extend) outward past an outer side face 376b of the first vertical post 370a. As a result, the cable 112 may be routed through the recess 310 along the outer side face 376b of the vertical post 370a, as shown in FIGS. 18-21. Because the cable 112 is recessed inwardly, and the cable clamp 180 does not extend (or minimally extends) outside the first vertical post 370a (e.g., past a plane extending from the trailer sidewall 14), the cable system 58 of this embodiment may not interfere with a skirt wall 60 that would extend downward from the sidewall 14. Accordingly, in this embodiment, a skirt system 52 may be installed after the support system 54 is installed. An additional first example cable clamp may be coupled to the second vertical post and the first truss beam in the same manner as the illustrated first example cable clamp 180 is connected to the first vertical post 370a in the third orientation 330.

Referring now to FIGS. 22-25, a fourth example cable support subassembly 400 includes a second example cable clamp 2180 connected to a fourth example cross-brace 462. The fourth example cross-brace 462 includes a first vertical post 470a, a second vertical post (not shown), a first truss beam (not shown), and a second truss beam 472b. It should be understood that the fourth example cross-brace 462 is a variation on, and thus structurally similar to, the first, second, and third example cross braces 62, 262, 362 of FIGS. 6-21. It should also be understood that the fourth example cross-brace 462 connects to the cross member 40 in the same manner as the first example cross-brace 62 of FIGS. 6-9.

Referring still to FIGS. 22-25, like the first, second, and third example cross braces 62, 262, 362 of FIGS. 6-21, the first truss beam and the second truss beam 472b of the fourth example cross-brace 462 diagonally cross one another and are connected to the first vertical post 470a and to the second vertical post. The first vertical post 470a is generally C-shaped, having a closed face 474, first and second closed sides 476a, b, and an open face 478. Each side face 476a, b may also include outer flanges 480. Like the first and second vertical posts 70a, b of FIGS. 6-9, the first vertical post 470a and the second vertical post are arranged opposite one another at a first end 496 and a second end (not shown) of the cross-brace 462. The second vertical post is generally identical to the first vertical post 470a. Thus, the first vertical post 470a and the second vertical post are mirror images of one another.

Referring again to FIGS. 22-25, the first truss beam and the second truss beam 472 b of FIGS. 22-25 are coupled to the first vertical post 470a and the second vertical post in the same manner as the first and second truss beams 72a, b of FIGS. 6-9 are coupled to the first and second vertical posts 70a, b of FIGS. 6-9. The first truss beam is generally identical to the second truss beam 472b. Thus, the first truss beam and the second truss beam 472b are mirror images of one another. Additionally, as shown in FIG. 24, at the lower portion of the first vertical post 470a, the inwardly-facing first side face 476a is shorter than the outwardly-facing second side face 476b to receive the diagonal second truss beam 472b. The second vertical post similarly receives the diagonal first truss beam (see FIG. 6).

Referring to FIGS. 22-25, in contrast with the first, second, and third example cross-braces 62, 262, 362 of FIGS. 6-21, the closed face 474 of the first vertical post 470a may extend downwardly (e.g., past a bottom edge 402 of the side face 476) to form a wing 479 as shown in FIGS. 22-25. Thus, the wing 479 extends downwardly beyond the second truss beam 472b. Similarly, the second vertical post also includes a wing that extends downwardly beyond the first truss beam (not shown). Additionally in contrast with the first, second, and third example cross-braces 62, 262, 362 of FIGS. 6-21, the respective wings 479 of the first vertical post 470a and the second vertical post may define a recess 404 sized to permit the cable 112 to pass through.

Figure 23:
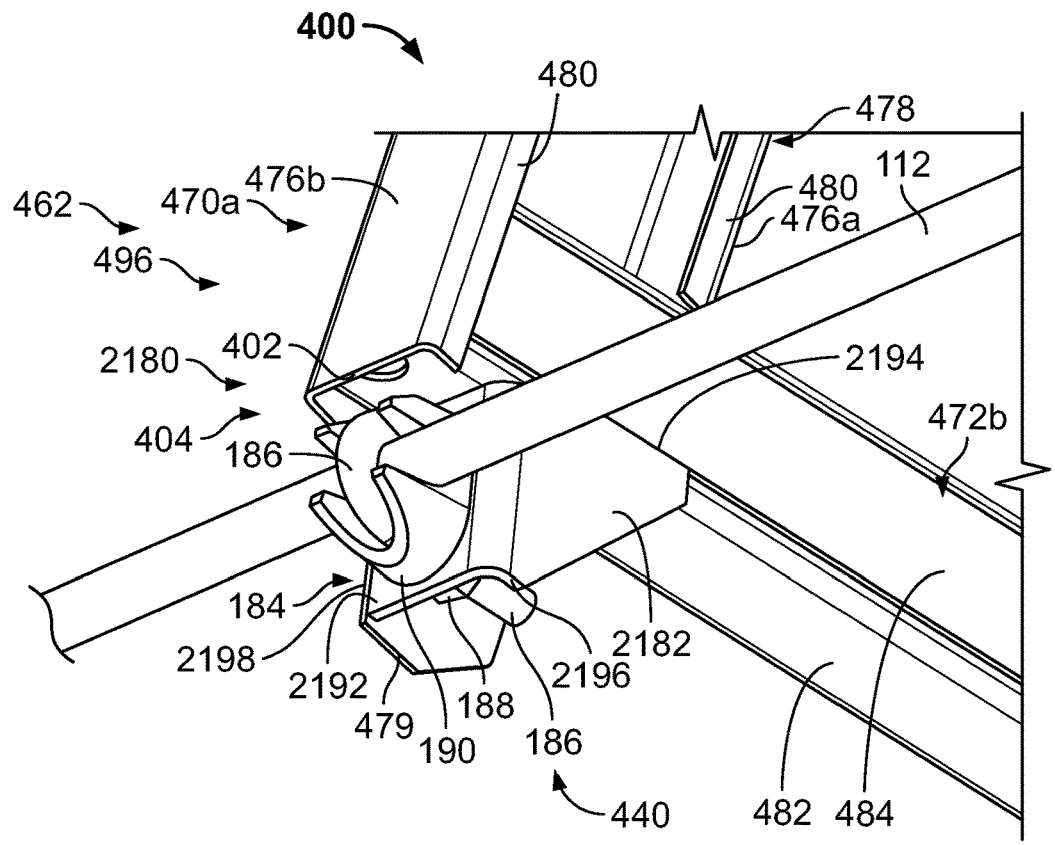
FIG. 23 is another partial isometric view of the second example cable clamp assembled to the fourth example cross-brace of FIG. 22.
Figure 24:
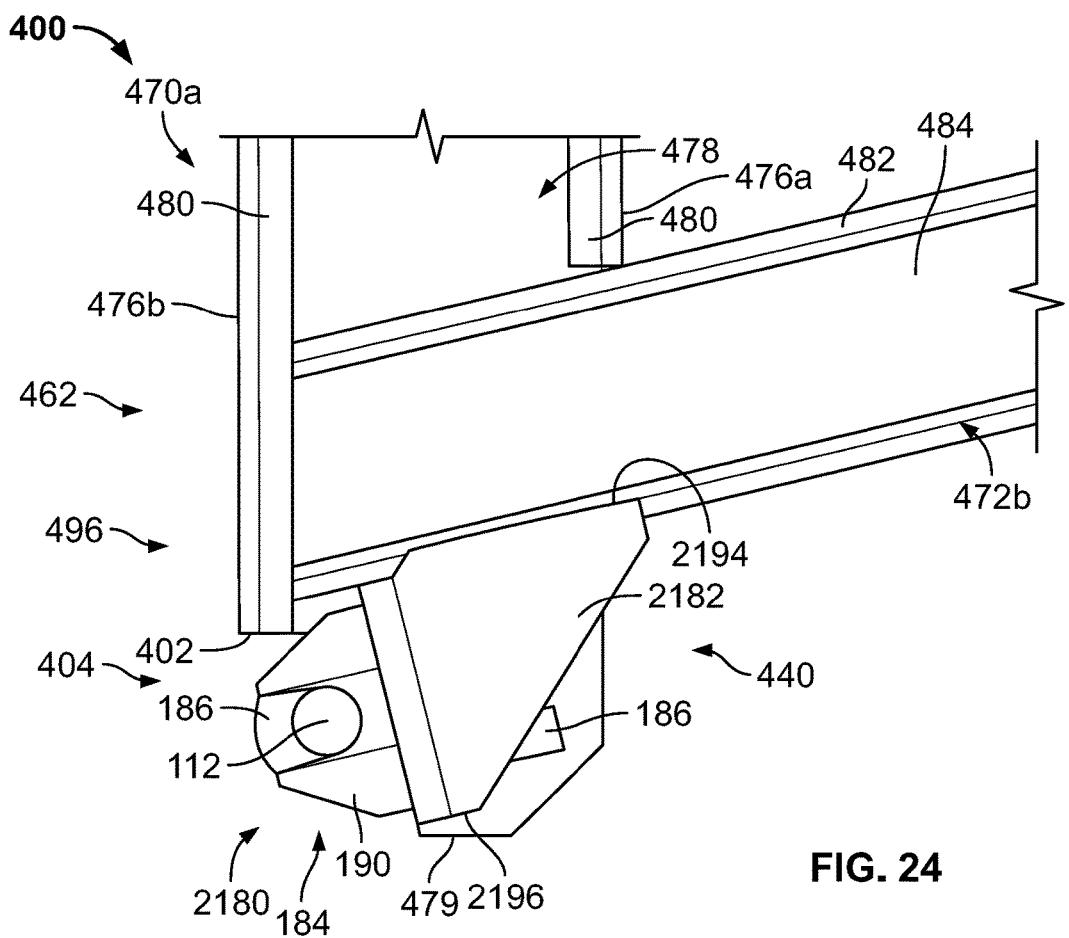
FIG. 24 is a partial front view of the second example cable clamp assembled to the fourth example cross-brace of FIGS. 22 and 23.
Figure 25:
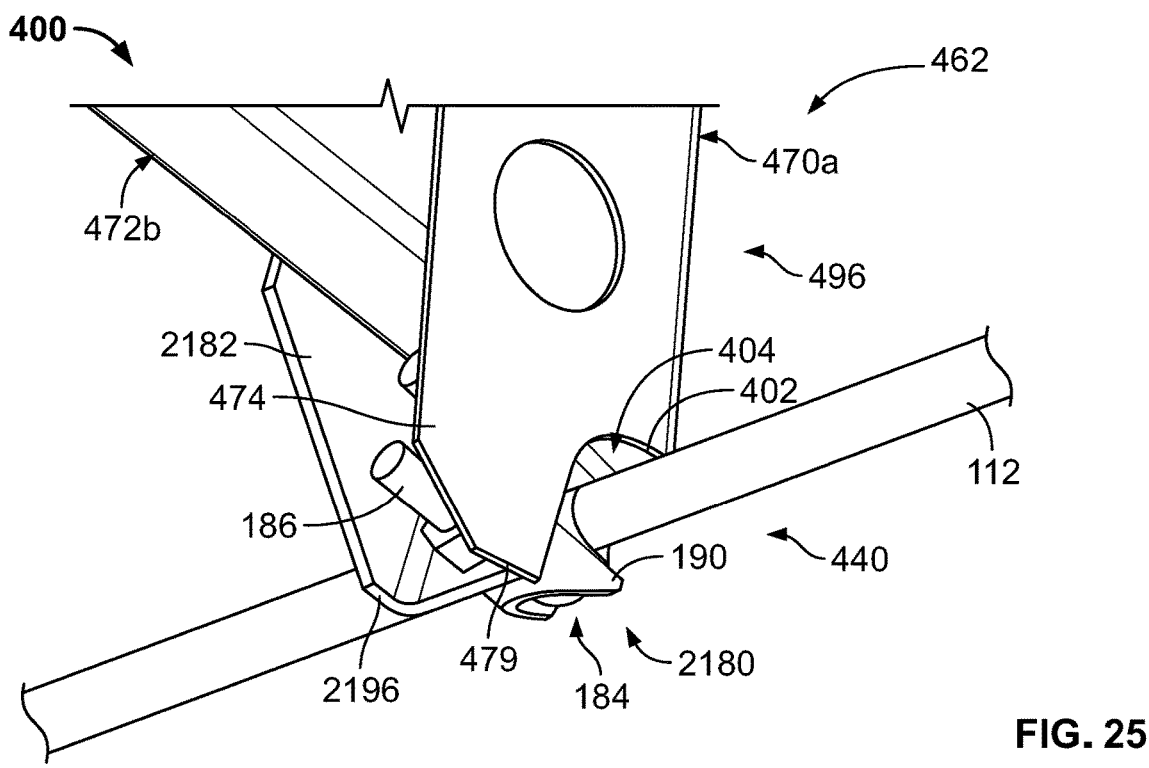
FIG. 25 is another partial isometric view of the second example cable clamp assembled to the fourth example cross-brace of FIGS. 22-24.

Like in the first, second, and third example cross-braces 62, 262, 362 of FIGS. 6-21, in some embodiments, as shown in FIGS. 22-25, the first truss beam and/or second truss beam 472b may be box-shaped. For example, as shown in FIGS. 23 and 24 the second truss beam 472b may include a C-shaped channel 482 with a plate 484 coupled over an open face of the C-shaped channel 482, thus creating a box-shaped channel with four solid faces. In some embodiments, the plate 484 may be stich welded to the C-shaped channel 482. The first truss beam may be formed of a C-shaped panel and a plate in the same manner as the second truss beam 472b. Alternatively, in some embodiments, the box-shaped first truss beam and/or the second truss beam 472b may be formed as a one-piece extruded component.

Referring to FIGS. 22-25, the first truss beam and the second truss beam 472b may be coupled to the lower and upper portions of the first vertical post 470a and the second vertical post, for example, via a welded coupling. However, other coupling mechanisms may be contemplated within the scope of this disclosure, such as bolts or fasteners. Furthermore, the first truss beam and the second truss beam 472b may be loaded in compression, then welded together to provide further structural integrity to the fourth example cross-brace 462. In other embodiments, however, the first truss beam and the second truss beam 472b may be pinned, bolted, bonded, hinged, or otherwise coupled together.

Looking still at FIGS. 22-25, it should be understood that, like the second and third example cross-braces 262, 362 of FIGS. 10-21, the first vertical post 470a, the second vertical post, the first truss beam, and the second truss beam 472b do not define apertures through which the cable 112 is routed, in contrast with the first example cross brace 62 of FIGS. 6-9 that defines the cable-routing apertures 114. Instead, similar to the examples of FIGS. 10-21, in some embodiments, as shown in FIGS. 22-25, the cable 112 may be coupled to the cross-braces 462 via second example cable clamps 2180 to form the support system 54 of connected fourth example cross-braces 462. Illustratively, the second example cable clamps 2180 may be coupled to the first vertical post 470a and to the second vertical post in a fourth orientation 440 below the first truss beam and the second truss beam 472b. Further, the cable 112 may be routed through the cable clamps 2180 and the recess 404 to couple the cable 112 to the cross-brace 362.

Referring to FIGS. 22-25, each second example cable clamp 2180 may include a bracket 2182 and the rope clip 184. As discussed above, the rope clip 184 includes the U-bolt 186, nuts 188, and the saddle 190 to secure the cable 112. More specifically, the bracket 2182 may define apertures (not shown), the U-bolt 186 may be routed through the apertures from one side of the bracket 2182, and the nuts 188 may be threaded or otherwise secured to the U-bolt 186 from the other side of the bracket 2182. In some embodiments, the saddle 190 may be welded or otherwise coupled to a surface 2192 of the bracket 2182. In other embodiments, the saddle 190 may be separate from the bracket 2182, and the nuts 188 may be tightened against the U-bolt 186 until the saddle 190 abuts the surface 2192 of the bracket 2182. In some embodiments, the saddle 190 may be omitted. In such embodiments, the cable 112 may be secured between the U-bolt 186 and the surface 2192.

An assembled cable clamp 2180 (that is, the U-bolt 186, the saddle 190, the cable 112, and the bracket 2182, assembled together via the nuts 188) may be coupled to the cross-brace 462 via the bracket 2182. More specifically, the bracket 2182 may be welded or otherwise coupled to the respective wings 479 of the first vertical post 470a and the second vertical post. Illustratively, the bracket 2182 may be substantially L-shaped, as shown in FIGS. 22-25, with a longer side edge 2194, a shorter side edge 2196, and a vertical edge 2198. The respective the longer side edges 2194 may be welded to the first truss beam and the second truss beam 472b. The respective the vertical edges may be welded to the wings 479. The L-shaped orientation, longer side edge 2194, and vertical edge 2198 may provide sufficient surface area for a strong weld connection while still permitting access to the nuts 188 when the bracket 2182 is coupled to the cross-brace 462. It should also be noted that, in some embodiments, the L-shaped orientation of FIG. 22-25 may instead be C-shaped.

Looking at FIGS. 22-25, more specifically, the cable clamp 2180 of the cable clamp recessed bottom fourth orientation 440 of FIGS. 22-25 may be coupled to the second truss beam 472b adjacent to a lower portion of the first vertical post 470a. The cable clamp 2180 may be coupled to a lower surface of the second truss beam 472b and/or an inner surface of the wing 479 so that the surface 2192 of the bracket 2182 faces outward, like the second orientation 220 of FIGS. 14-17, but the coupling may be recessed inward so that the U-bolt 186 and the saddle 190 do not extend (or minimally extend) outward past an outer side face 476b of the first vertical post 470a. As a result, the cable 112 may be routed through the recess 404 along the underside of the first vertical post 470a, as shown in FIGS. 22-25. Because the cable 112 is recessed inward, and the cable clamp 2180 does not extend (or minimally extends) outside the first vertical post 470a (e.g., past a plane extending from the trailer sidewall 14), the cable system 58 of this embodiment may not interfere with a skirt wall 60 that would extend downward from the sidewall 14. An additional second example cable clamp may be coupled to the second vertical post and the first truss beam in the same manner as the illustrated second example cable clamp 2180 is connected to the first vertical post 470a and the second truss beam 472b in the fourth orientation 440. Additionally, in some embodiments, to accommodate for cable clamps 2180 underneath the first truss beam and the second truss beam 472b, the first truss beam and the second truss beam 472b may be respectively coupled at higher positions along the second vertical post and the first vertical post 470a compared to the embodiments of FIGS. 10-21. As a result, the first truss beam and the second truss beam 472b in this embodiment may be shorter than, and therefore weigh less than, the truss beams in the embodiments of FIGS. 10-21.

Figure 26:
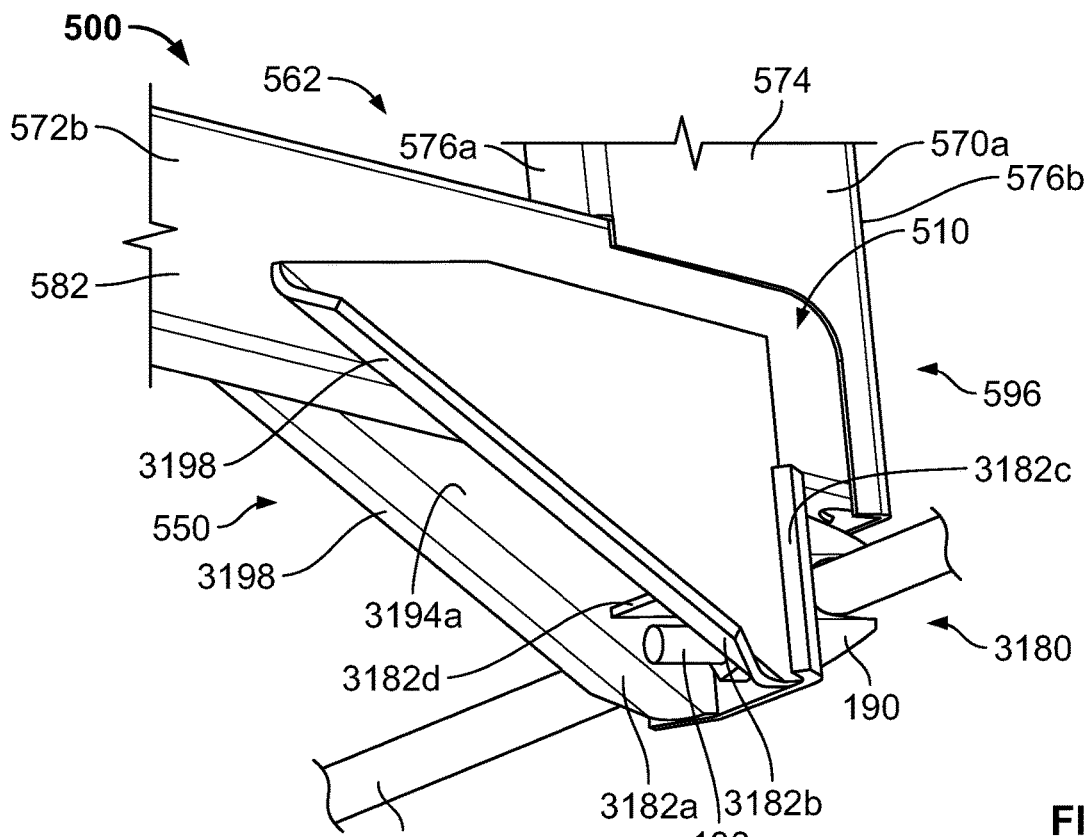
FIG. 26 is a partial isometric view of a third example cable clamp assembled to a fifth example cross-brace for use with the cable system of the side underride system of FIGS. 1-5.
Figure 27:
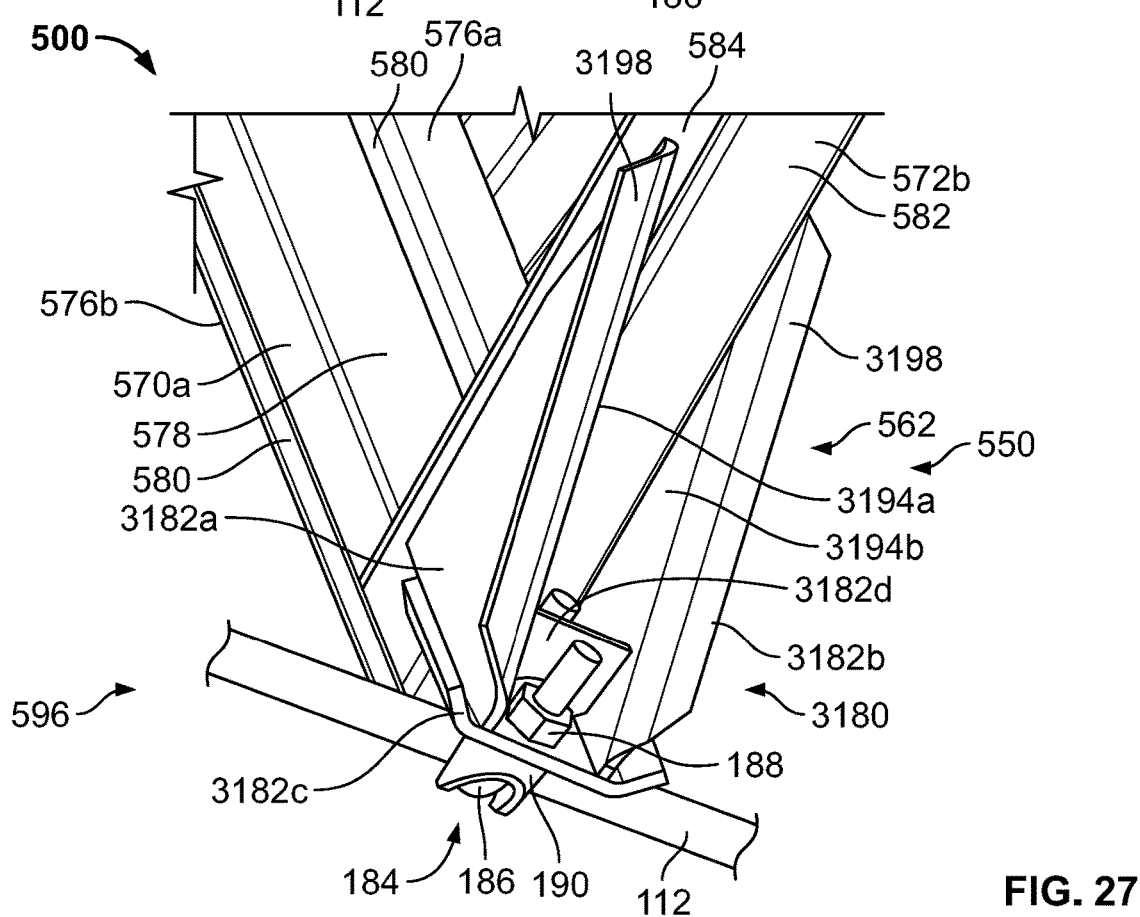
FIG. 27 is another partial isometric view of the third example cable clamp assembled to the fifth example cross-brace of FIG. 26.
Figure 28:
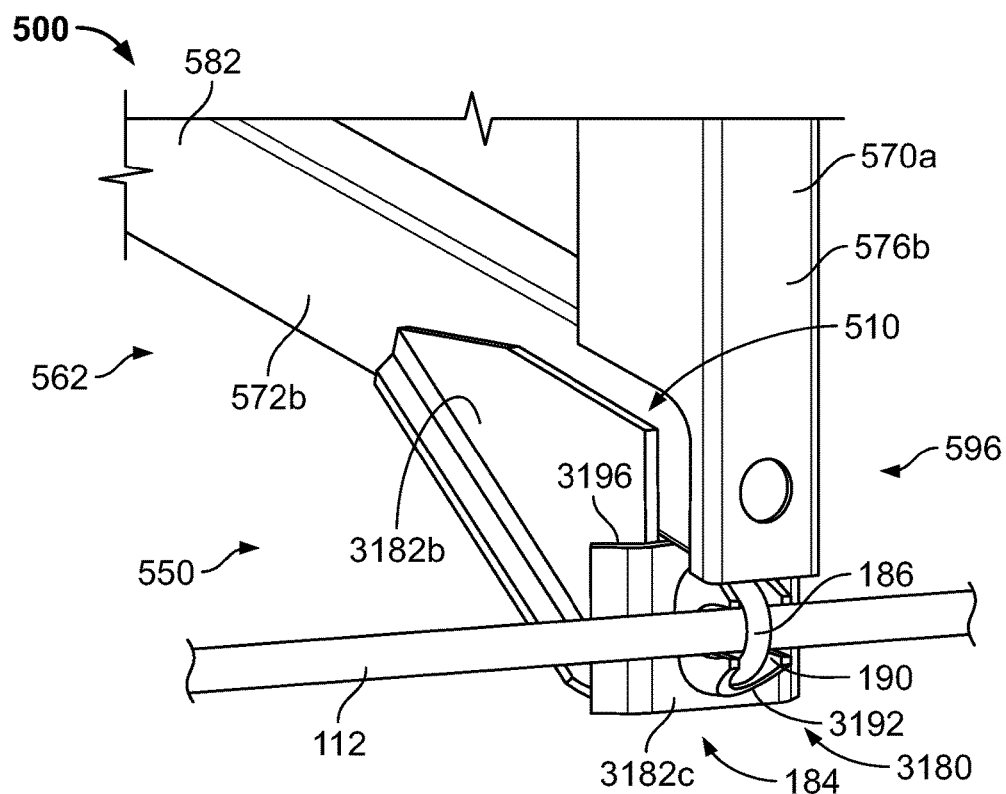
FIG. 28 is another partial isometric view of the third example cable clamp assembled to the fifth example cross-brace of FIGS. 26-27.

Referring now to FIGS. 26-28, a fifth example support subassembly 500 includes a third example cable clamp 3180 connected to a fifth example cross-brace 562. The fifth example cross-brace 562 includes a first vertical post 570a, a second vertical post (not shown), a first truss beam (not shown), and a second truss beam 572b. It should be understood that the fifth example cross-brace 562 is a variation on, and thus structurally similar to, the first, second, third, and fourth example cross braces 62, 262, 362, 462 of FIGS. 6-25. It should also be understood that the fifth example cross-brace 562 connects to the cross member 40 in the same manner as the first example cross-brace 62 of FIGS. 6-9.

Referring still to FIGS. 26-28, like the first, second, third, and fourth example cross braces 62, 262, 362, 462 of FIGS. 6-25, the first truss beam and the second truss beam 572b of the fifth example cross-brace 562 diagonally cross one another and are connected to the first vertical post 570a and to the second vertical post. The first vertical post 570a is generally C-shaped, having a closed face 574, first and second closed sides 576a, b, and an open face 578. Each side face 576a, b may also include outer flanges 580. Like the first and second vertical posts 70a, b of FIGS. 6-9, the first vertical post 570a and the second vertical post are arranged opposite one another at a first end 596 and a second end (not shown) of the cross-brace 562. The second vertical post is generally identical to the first vertical post 570a. Thus, the first vertical post 570a and the second vertical post are mirror images of one another.

The first truss beam and the second truss beam 572b are coupled to the first vertical post 570a and the second vertical post in the same manner as the first and second truss beams 72a, b of FIGS. 6-9 are coupled to the first and second vertical posts 70a, b of FIGS. 6-9. The first truss beam is generally identical to the second truss beam 572b. Thus, the first truss beam and the second truss beam 572b are mirror images of one another. Additionally, as shown in FIG. 27, at the lower portion of the first vertical post 570a, the inwardly-facing first side face 576a is shorter than the outwardly-facing second side face 576b to receive the diagonal second truss beam 572b. The second vertical post similarly receives the diagonal first truss beam (see FIG. 6).

Referring to FIGS. 26-28, in contrast with the first, second, third, and fourth example cross-braces 62, 262, 362, 462 of FIGS. 6-25, the closed face 574 of the first vertical post 570*a* may define a recess 510 sized to accommodate a third example cable clamp 3180. The recess 510 is inboard of the outwardly-facing second side face 576*b*. Thus, the recess 510 is inwardly-facing.

Like in the first, second, third, and fourth example cross-braces 62, 262, 362, 462 of FIGS. 6-25, in some embodiments, as shown in FIGS. 22-25, the first truss beam and/or second truss beam 572*b* may be box-shaped. For example, as shown in FIG. 27, the second truss beam 572*b* may include a C-shaped channel 582 with a plate 584 coupled over an open face of the C-shaped channel 582, thus creating a box-shaped channel with four solid faces. In some embodiments, the plate 584 may be stitch welded to the C-shaped channel 582. The first truss beam may be formed of a C-shaped panel and a plate in the same manner as the second truss beam 572*b*. Alternatively, in some embodiments, the box-shaped the first truss beam and/or the second truss beam 572*b* may be formed as a one-piece extruded component.

Referring to FIGS. 26-28, the first truss beam and the second truss beam 572*b* may be coupled to the lower and upper portions of the first vertical post 570*a* and the second vertical post, for example, via a welded coupling. However, other coupling mechanisms may be contemplated within the scope of this disclosure, such as bolts or fasteners. Furthermore, the first truss beam and the second truss beam 572*b* may be loaded in compression, then welded together to provide further structural integrity to the fifth example cross-brace 562. In other embodiments, however, the first truss beam and the second truss beam 572*b* may be pinned, bolted, bonded, hinged, or otherwise coupled together.

Looking still at FIGS. 26-28, it should be understood that, like the second, third, and fourth example cross-braces 262, 362, 462 of FIGS. 10-25, the first vertical post 570*a*, the second vertical post, the first truss beam, and the second truss beam 572*b* do not define apertures through which the cable 112 is routed, in contrast with the first example cross brace 62 of FIGS. 6-9 that defines the cable-routing apertures 114. Instead, similar to the examples of FIGS. 10-25, in some embodiments, as shown in FIGS. 26-28, the cable 112 may be coupled to the cross-braces 562 via third example cable clamps 3180 to form the support system 54 of connected fifth example cross-braces 562. Illustratively, the third example cable clamps 3180 may be coupled to the first truss beam and to the second truss beam 572*b* in a fifth orientation 550 below the first vertical post 570*a* and the second vertical post. Further, the cable 112 may be routed through the cable clamps 3180 to couple the cable 112 to the cross-brace 562.

Referring to FIGS. 26-28, each third example cable clamp 180 may include a bracket 3182 and the rope clip 184. The bracket 3182 includes first side plate 3182*a*, a second side plate 3182*b*, a bridge 3182*c*, and a connecting plate 3182*d*. As discussed above, the rope clip 184 includes the U-bolt 186, nuts 188, and the saddle 190 to secure the cable 112.

Looking still at FIGS. 26-28, the first and second side plates 3182*a, b* are generally triangular and opposing mirror images of one another. The first and second side plates 3182*a, b* include stiffening flanges 3198. The bridge 3182*c* is generally concave and connects the first and second side plates 3182*a, b* to one another. Thus, the assembled first and side plates 3182*a, b* and the bridge 3182*c* are generally C-shaped. The first and second side plates 3182*a, b* extend upwardly from the bridge 3182*c*. The connecting plate 3182*d* is connected to the first and second side plates 3182*a,* *b* and to the bridge 3182*c*. The connecting plate 3182*d* extends inwardly from the bridge 3182*c* between the first and second side plates 3182*a, b*. In some embodiments, the first and second side plates 3182*a, b*, the bridge 3182*c*, and the connecting plate 3182*d* are variously connected to one another via welding.

Referring again to FIGS. 26-28, the bridge 3182*c* may define apertures (not shown), the U-bolt 186 may be routed through the apertures from one side of the bridge 3182*c*, and the nuts 188 may be threaded or otherwise secured to the U-bolt 186 from the other side of the bridge 3182*c*. The connecting plate 3182*d* is disposed between the apertures. In some embodiments, the saddle 190 may be welded or otherwise coupled to a surface 3192 of the bridge 3182*c*. In other embodiments, the saddle 190 may be separate from the bridge 3182*c*, and the nuts 188 may be tightened against the U-bolt 186 until the saddle 190 abuts the surface 3192 of the bridge 3182*c*. In some embodiments, the saddle 190 may be omitted. In such embodiments, the cable 112 may be secured between the U-bolt 186 and the surface 3192.

An assembled cable clamp 3180 (that is, the U-bolt 186, the saddle 190, the cable 112, and the bracket 3182, assembled together via the nuts 188) may be coupled to the cross-brace 562 via the bracket 3182. More specifically, inner surfaces 3194*a, b* of the first and second side plates 3182*a, b* and an upper edge 3196 of the bridge 3182*c* may be welded or otherwise coupled to the first truss beam and the second truss beam 572*b*. Thus, the first and second side plates 3182*a, b* and the bridge 3182*c* are partially disposed in the recess 510 and extend downwardly from the second truss beam 572*b* and the first vertical post 570*a*. The C-shaped orientation, inner surfaces 3194*a, b*, and upper edge 3196 may provide sufficient surface area for a strong weld connection while still permitting access to the nuts 188 when the bracket 3182 is coupled to the cross-brace 562.

Looking at FIGS. 26-28, more specifically, the cable clamp 3180 of the cable clamp recessed bottom fourth orientation 550 of FIGS. 26-28 may be coupled to the second truss beam 572*b* adjacent to a lower portion of the first vertical post 570*a* so that the surface 3192 of the bridge 3182*c* faces outwardly, like the second orientation 220 of FIGS. 14-17, but the coupling may be recessed inward so that the U-bolt 186 and the saddle 190 do not extend (or minimally extend) outward past an outer side face 576*b* of the first vertical post 570*a*. As a result, the cable 112 may be routed along the underside of the second truss beam 572*b*, as shown in FIGS. 26-28. Because the cable 112 is recessed inward, and the cable clamp 3180 does not extend (or minimally extends) outside the first vertical post 570*a* (e.g., past a plane extending from the trailer sidewall 14), the cable system 58 of this embodiment may not interfere with a skirt wall 60 that would extend downward from the sidewall 14. An additional third example cable clamp may be coupled to the second vertical post and the first truss beam in the same manner as the illustrated third example cable clamp 3180 is connected to the first vertical post 570*a* and the second truss beam 572*b* in the fifth orientation 550.

The embodiments shown in FIGS. 10-28 allow the cable system 58 to be completely assembled before being installed within the brace system 56. For example, in embodiments where the cable 112 is routed through apertures 114 of the cross-braces 62, the cable system assembly may only take place after installation of the brace system 56. On the other hand, in the embodiments of FIGS. 10-28, the cable system 58 and the brace system 56 may be independent components of the support system 54 capable of being separately assembled and/or disassembled. As a result, either system 58, 56 may be removed for repair or replacement without the need to disassemble the complete support system 54.

Referring to FIGS. 10-21, the first example cable clamps 180 can be coupled to or mounted on the vertical posts or the truss beams of the second and third example cross braces 262, 362 in a variety of orientations, such as the first orientation 210 that routes the cable 112 under the first vertical post 270a (as shown in FIGS. 10-13), the second orientation that routes the cable 112 outside the first vertical post 270a (as shown in FIGS. 14-17), or the third orientation 330 that routes the cable 112 through the recess 310 on an outside of the third vertical post 370 (as shown in FIGS. 18-21). Additionally, the second example cable clamp 2180 can be coupled to the fourth example cross brace 462 in the fourth orientation 440 that routes the cable 112 through the recess 404 at a bottom of the vertical post 470a (as shown in FIGS. 22-25). Further, the third example cable clamp 3180 can be coupled to the fifth example cross brace 562 in the fifth orientation 550 that routes the cable 112 below the second truss beam 572b and inboard of the outwardly-facing second side face 576b (as shown in FIGS. 26-28). The differences in these orientations may affect weight, cost, strength, aerodynamics, ease of fabrication and assembly, installation sequence, and/or component access. Because each of these orientations uses a single cable clamp (e.g., first, second, or third example cable clamps 180, 2180, 3180) per vertical post, the resulting cross-brace assemblies are lighter than other designs that require multiple clamping mechanisms. As a result, these orientations may provide a low-weight, low-cost solution for a cable system 58 that may be compatible with new brace systems 56 or to retrofit older systems.

Referring back to FIGS. 3-5, the cable system 58 may span a length of the trailer 10. In some embodiments, the cable system 58 may span substantially the entire length of the brace system 56 and/or the skirt system 52. For example, as shown in FIGS. 3-5, the cable 112 may span from the landing gear 24 to the floor assembly 26 adjacent the rear wheel assembly 22. Furthermore, as the cable 112 is routed through or coupled to the cross-braces 62, the cable system 58 may follow the angled profile of the brace system 56, as shown in FIG. 5. Illustratively, this angled or curved profile of the brace system 56 and the cable system 58 may permit a positioning of the skirt system 52 that is more efficient than a skirt system mounted parallel to the side walls 14 of the trailer 10. The cable flexibility allows the cable system 58 to be routed in different orientations or angles while still being stiff enough to transfer loads to adjoining cross-braces 62. It is also contemplated within the scope of this disclosure to include a cable system 58 that spans shorter or longer lengths than the brace system 56 or the skirt system 52. For example, the cable system 58 may span from the landing gear 24 to the rear impact guard, or may be routed across a width of the trailer 10 through the rear impact guard, the landing gear 24, or other mounting brackets to generally form a continuous cable loop around the trailer 10. It should be appreciated that the cable system 58 may be used in conjunction with any of the above described example cross-braces 62, 262, 362, 462, 562 and cable clamp 180, 2180, 3180 assemblies.

Figure 29:
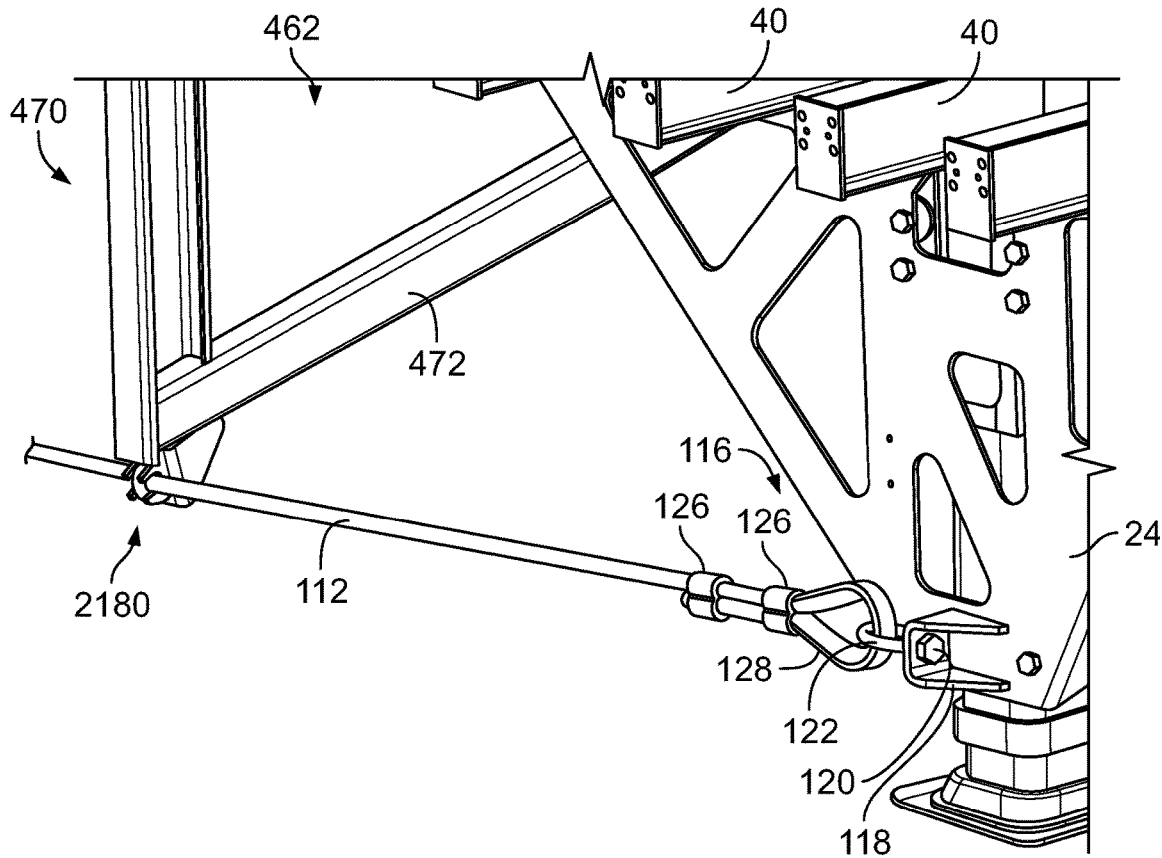
FIG. 29 is a partial isometric view of an anchor point of the cable system of the side underride system of FIGS. 1-5.

Looking at FIGS. 3 and 4, the cable 112 may be permanently or removably anchored to the landing gear 24, the floor assembly 26, and/or other components of the trailer 10. In other words, the cable 112 may be directly anchored to the trailer 10. For example, as shown in FIGS. 3 and 4, the cable system 58 may include an anchor point 116 at the landing gear 24 and an anchor point 130 (see FIG. 3) on the floor assembly 26 adjacent the rear wheel assembly 22. As shown in FIG. 29, the anchor point 116 may include a bracket 118, a bolt 120, and an eye nut 122. The bracket 118 may be welded to the landing gear 24 and include an aperture (not shown) to receive the bolt 120 therethrough. Further, as shown in FIG. 29, the eye nut 122 may be threaded onto the bolt 120 after the bolt is routed through the aperture. The cable 112 may be routed through the eye nut 122 and then doubled onto itself for increased strength at the anchor point 116.

As shown in FIG. 29, one or more clamps 126 may wrap around the doubled-up portion of the cable 112 to secure the cable 112 at the anchor point 116. Additionally, in some embodiments, as shown in FIG. 29, the anchor point 116 may include a curved sleeve or track 128 to reduce stress on the cable 112 where it routes through the eye nut 122 and to potentially reduce twisting of the cable 112 at the point where it is routed through the eye nut 122. In some embodiments, the cable 112 may be previously wrapped through the forged eye nut 122 and crimped with the clamps 126 on either end to form a preset length (e.g., as a pre-clamped assembly). Upon installation, the cable 112 may be tensioned at the landing gear 24 by tightening the bolt 120 and eye nut 122 arrangement.

In some embodiments, the cable 112 may include one or more steel cables and may be approximately ½ inch to ¾ inch in diameter. In one specific embodiment, the cable 112 may be approximately ⅝ inch in diameter. Of course, it is within the scope of this disclosure to include any number of cables of any diameter made from other suitable materials including composite rope, composite fibers, and other suitable high strength, low stretch materials, and having other suitable diameters. Further, the cable 112 may be covered in ballistic nylon or canvas. Any of the cable concepts, or any other concepts, disclosed in U.S. Provisional Application Ser. No. 62/487,743, filed on Apr. 20, 2017, and entitled Side Underride Guard, may also be utilized with the embodiments described herein. Furthermore, any of the concepts disclosed in U.S. Provisional Application Ser. No. 62/487,775, filed on Apr. 20, 2017, U.S. Provisional Application Ser. No. 62/557,977, filed on Sep. 13, 2017, and U.S. Pat. No. 8,162,384 may be utilized with the embodiments described herein. The disclosure of such applications are hereby incorporated by reference in their entirety.

As described above, a trailer 10 may be provided with a side underride system 50 including a skirt system 52 with skirt walls 60 and a support system 54 with any number of cross-braces 62 and a cable system 58 between the skirt walls 60. Any one of the support systems 54 described above may be retrofit with existing skirt systems, may be added with new skirt systems, or may completely replace existing skirt systems. The above-described side underride system 50 may provide dual functions of potentially improving aerodynamic efficiency (i.e., via the skirt system) and providing side underride protection (i.e., via the skirt system and the support system) without presenting operational limitations, such as difficult or costly installation, limiting access to the underside of the floor assembly 26, or adding considerable weight to the trailer 10. Alternatively, the above-described side underride system 50 may solely provide side underride protection (i.e., via the support system, without a skirt system) without presenting such operational limitations. Such side underride protection may reduce the risk of passenger vehicle underride in the event of a side impact collision, and may reduce the risk of pedestrians, bicyclists, or motorcyclists from falling or sliding under the trailer 10, for example, between the landing gear 24 and the rear wheel assembly 22.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

We claim:

1. A side underride system configured to be coupled to a trailer, comprising:
    a support system configured to be positioned below the trailer to provide side underride protection, the support system including:
        a cable system configured to couple to the trailer; and
        a brace system including a plurality of cross-braces that each extend at least partially across a width of the trailer, are spaced apart at intervals along a length of the trailer, and are configured to capture the cable system,
        wherein the cable system is configured to couple to the trailer at a first anchor point forward of a forward-most cross-brace of the plurality of cross-braces and couple to the trailer at a second anchor point rearward of a rearward-most cross-brace of the plurality of cross-braces.

2. The side underride system of claim 1, wherein:
    the cable system includes a cable,
    the plurality of cross-braces each include a cable clamp configured to engage with the cable, and
    each cable clamp includes a bracket coupled to a truss beam of the respective cross-brace of the plurality of cross-braces and a rope clip engaged with the bracket and configured to capture the cable.

3. The side underride system of claim 1, further comprising a skirt system configured to be positioned below the trailer to reduce airflow under the trailer, wherein the support system is positioned between the skirt system.

4. A side underride support subassembly for a side underride system with a cable system configured to be coupled to a trailer, the side underride support subassembly comprising:
    a cross-brace comprising:
        first vertical and second vertical posts opposite one another,
        a first truss beam coupled to an upper portion of the first vertical post and a lower portion of the second vertical post, and
        a second truss beam coupled to an upper portion of the second vertical post and a lower portion of the first vertical post,
        the first and second truss beams diagonally crossing one another; and
    first and second cable clamps connected to the cross-brace and configured to support the cable system.

5. The side underride support subassembly of claim 4, wherein:
    the first cable clamp is connected to the first vertical post, and
    the second cable clamp is connected to the second vertical post.

6. The side underride support subassembly of claim 4, wherein one or more of the first and second cable clamps extend outwardly from the cross-brace.

7. The side underride support subassembly of claim 4, wherein one or more of the first and second cable clamps extend downwardly from the cross-brace.

8. The side underride support subassembly of claim 4, wherein:
    one or more of the first and second vertical posts defines a recess, and
    one or more of the cable clamps is connected to the cross brace inboard of the recess.

9. The side underride support subassembly of claim 8, wherein:
    the one or more of the first and second vertical posts has a closed face and an outwardly-facing side, and
    the recess is defined in a lower portion of the closed face inboard of the outwardly-facing side.

10. The side underride support subassembly of claim 4, wherein:
    the first cable clamp is connected to the first truss beam, and
    the second cable clamp is connected to the second truss beam.

11. The side underride support subassembly of claim 4, wherein:
    each of the first and second cable clamps includes:
        a bracket connected to the cross brace, and
        a rope clip connected to the bracket and configured to compress a cable toward the bracket.

12. The side underride support subassembly of claim 4, wherein the cable clamp is below the vertical support.

13. The side underride support subassembly of claim 4, wherein:
    the one or more of the first and second vertical posts has an outwardly-facing side,
    the cable clamp is inboard of the outwardly-facing side.

* * * * *